US012737140B2

(12) United States Patent
Faltas et al.

(10) Patent No.: US 12,737,140 B2
(45) Date of Patent: Sep. 15, 2026

(54) OUT-OF-ORDER READ-RETURN EQUALIZATION

(71) Applicant: CIENA CORPORATION, Hanover, MD (US)

(72) Inventors: Marianne Michel Faltas, Ottawa (CA); Peter Andreas Meyer, Almonte (CA); Mark Stephen Wight, Ottawa (CA)

(73) Assignee: CIENA CORPORATION, Hanover, MD (US)

( * ) Notice: Subject to any disclaimer, the term of this patent is extended or adjusted under 35 U.S.C. 154(b) by 2 days.

(21) Appl. No.: 19/020,163

(22) Filed: Jan. 14, 2025

(65) Prior Publication Data

US 2026/0202992 A1 Jul. 16, 2026

(51) Int. Cl.
*G06F 3/00* (2006.01)
*G06F 3/06* (2006.01)
*G06F 12/00* (2006.01)

(52) U.S. Cl.
CPC ............ *G06F 3/0659* (2013.01); *G06F 3/061* (2013.01); *G06F 3/0673* (2013.01)

(58) Field of Classification Search
CPC ....... G06F 3/0659; G06F 3/061; G06F 3/0673
USPC .......................................................... 711/154
See application file for complete search history.

(56) References Cited

U.S. PATENT DOCUMENTS 5,059,975 A 10/1991 Nakatsuka
9,563,579 B2 * 2/2017 Cutter ...................... G06F 9/00
10,819,647 B2 * 10/2020 Zemach .............. H04L 43/0852
11,405,327 B2 * 8/2022 Zemach .................. H04L 47/56
11,550,982 B2 * 1/2023 Giaconi ................ G06F 30/394
11,568,115 B2 * 1/2023 Giaconi .............. G06F 13/4295
11,586,566 B2 * 2/2023 Walker .................... G06F 13/18
2001/0037445 A1 * 11/2001 Mukherjee .......... G06F 11/1405 712/216
2005/0188064 A1 * 8/2005 Schoinas ................ H04L 69/12 709/221
2006/0112385 A1 * 5/2006 Jeong .................... G11C 11/406 717/168
2008/0282031 A1 * 11/2008 Tanoue ................ G06F 3/0689 711/E12.001

(Continued)

OTHER PUBLICATIONS

"What does the "posted" mean in posted PCIE transaction?", https://electronics.stackexchange.com/questions/15129/what-does-the-posted-mean-in-posted-pcie-transaction, Jun. 10, 2011, 3 pgs.

*Primary Examiner* — Sheng Jen Tsai
(74) *Attorney, Agent, or Firm* — GUNTIN & GUST, PLC; Mark Wilinski

(57) ABSTRACT

Aspects of the subject disclosure may include, for example, generating a group of ordered identification tags that are appended to a group of pending read-request operations generated by a leader process and requesting a return of read data from a group of follower processes. A group of read-return operations including the group of ordered identification tags is intercepted and includes, in no particular order, read data obtained from the group of follower processes responsive to the group of pending read-request operations. The group of read-return operations is arranged according to the group of ordered identification tags to obtain a group of ordered, read-return operations including ordered read data obtained from the group of follower processes and provided to the leader process. Other embodiments are disclosed.

20 Claims, 8 Drawing Sheets

(56) References Cited

U.S. PATENT DOCUMENTS

| | | | | |
|---|---|---|---|---|
| 2011/0185102 | A1* | 7/2011 | Deogharia | G06F 13/4059 711/E12.001 |
| 2014/0240326 | A1* | 8/2014 | Cutter | G06F 13/1626 711/147 |
| 2016/0011930 | A1* | 1/2016 | Yeh | G11C 16/349 714/15 |
| 2019/0173769 | A1* | 6/2019 | Zemach | H04L 49/90 |
| 2020/0050366 | A1* | 2/2020 | Bavishi | G06F 3/0656 |
| 2021/0029054 | A1* | 1/2021 | Zemach | H04L 47/56 |
| 2022/0101939 | A1 | 3/2022 | Ohyama et al. | |
| 2023/0120184 | A1* | 4/2023 | Kachare | G06F 3/061 711/154 |
| 2024/0142954 | A1 | 5/2024 | Minamida et al. | |
| 2024/0171520 | A1* | 5/2024 | Friedman | H04L 49/9036 |

* cited by examiner

300

400

600

700

OUT-OF-ORDER READ-RETURN EQUALIZATION

FIELD OF THE DISCLOSURE

The subject disclosure relates to out-of-order read-return equalization.

BACKGROUND

Data may be exchanged between different processes and/or entities using read and/or a write commands. A read command may be issued by one entity to read data stored at a memory location and/or a register associated with another entity. The read command generally identifies a memory location and/or register at which data is to be read from. A read return returns to the requesting process data obtained from the identified memory location and/or register. Likewise, a write command may be issued by one entity to write data to a memory location and/or a register associated with another entity. The write command generally identifies data and a memory location and/or register at which the data is to be written to.

By way of example, read commands over a bus architecture, such as a legacy PCI bus, include a command, e.g., a read signal and an address. A read command issued by a leader process invokes a response from a follower process providing return data requested by the read command. Accordingly, the leader can confirm that a read has been completed upon return of the requested data. A leader process may issue subsequent read commands upon confirmation that a pending read command has been satisfied. Similarly, write commands over a bus architecture, such as a legacy PCI bus, include a command, e.g., a write signal, an address and data. A write command issued by one process may invoke a response from another process indicating that the write command has been completed, e.g., a "done" indication.

BRIEF DESCRIPTION OF THE DRAWINGS

Reference will now be made to the accompanying drawings, which are not necessarily drawn to scale, and wherein.

DETAILED DESCRIPTION

Figure 1:
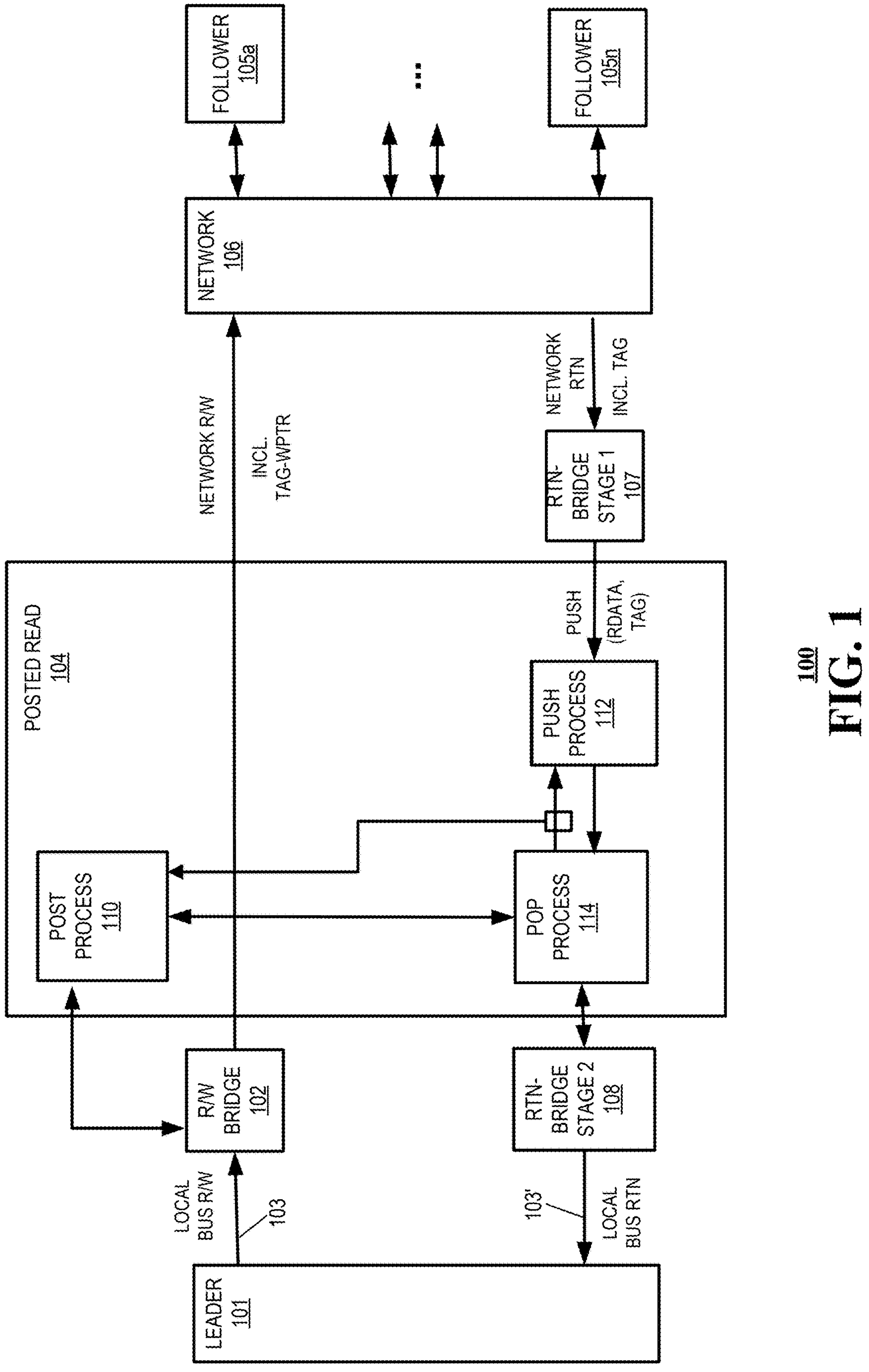
FIG. 1 is a block diagram illustrating an example, non-limiting embodiment of an out-of-order read-return equalization system functioning in accordance with various aspects described herein.

The subject disclosure describes, among other things, illustrative embodiments for a self-contained layer positioned between a leader entity and a follower entity, as may be implanted over local bus and a distributed network, that sends read cycles, accepts out-of-order read returns and returns in-ordered read returns. In at least some embodiments, the self-contained layer includes post, push and pop modules to realize the preferred ordering of out-of-order read returns and to support posted read commands, allowing for efficient processing of read commands in a reliable and deterministic manner.

One or more aspects of the subject disclosure include a process for managing read returns. The process includes generating, by a processing system including a processor, a group of reference tags that are appended to a group of pending read-request operations. The group of pending read-request operations are generated according to an ordered arrangement by a leader process and request a return of read data from a group of follower processes. The process includes intercepting, by the processing system, a group of read-return operations including the group of reference tags. The group of read-return operations includes returned read data obtained in no particular order from the group of follower processes responsive to the group of pending read-request operations. The process further includes arranging, by the processing system, the returned read data obtained in no particular order via the group of read-return operations according to the group of reference tags to obtain ordered returned read data according to the ordered arrangement, and providing, by the processing system, the ordered returned read data to the leader process.

One or more aspects of the subject disclosure include a read-return management system, that includes a post process module configured to generate a group of reference tags. The group of reference tags are appended to a group of pending read-request operations generated by a leader process and requesting read data from a group of follower processes. The read-return management system also includes a push process module configured to intercept a group of read-return operations that includes, in no particular order, a group of returned read data segments obtained from the group of follower processes responsive to the group of pending read-request operations. The group of returned read data segments includes the group of reference tags corresponding to the group of pending read data operations. The group of returned read data segments are arranged according to the group of reference tags to obtain a group of ordered, ordered returned read data segments. The read-return management system further includes a pop process module in communication with the post process module and the push process module. The pop process module is configured to provide the group of ordered, returned read data segments to the leader process responsive to information obtained from the post process module and information obtained from the push process module.

One or more aspects of the subject disclosure include a read-return management system, that includes a post queue having a group of post queue storage locations accessible via a post write location indicator. The post queue, responsive to a posted read command of a group of posted read commands issued by a leader process, is configured to obtain a post reference value corresponding to an ordering of the group of posted read commands, and to provide the post reference value to the leader process, permitting an appending of the post reference value to the posted read command to obtain an order-referenced posted read command. The read-return management system also includes a push queue including a group of push queue storage locations accessible via a push write location indicator. The push queue, responsive to interception of an order-referenced read-return, stores the order-referenced read-return at a push queue storage location corresponding to a push reference value of the push write location indicator. The push reference value further corresponds to the post reference value. The read-return management system further includes a pop process module in communication with the post queue and the push queue. The pop process module is configured to detect a presence of ordered, read-return data within the push queue, ordered according to the ordering of posted read commands of the group of posted read commands issued by a leader process, and to provide the ordered, read-return data to the leader process.

In many applications it is necessary for a system, process and/or device, referred to generally herein as a leader entity or leader, to request data from another system, process and/or device, referred to generally herein as a follower entity or follower. In at least some applications, the data may be requested and/or otherwise provided according to a read operation. A read operation can include a read command, sometimes referred to as a read request, as may be issued by the leader and requesting that data be read from the follower. The read request may identify a location of the requested read data, e.g., a device identifier, memory location and/or address. Alternatively, or in addition, the read request may identify one or more other attributes of the requested read data, such as a type and/or size of the data. The read operation can include a read return that returns the requested read data obtained from the follower and directed to the leader.

In at least some embodiments, read operations may be implemented according to a synchronous device, system and/or process in which operations are performed according to a timing reference, e.g., a clock source providing clock cycles. In such instances the read command may include a read request cycle during which a read request is issued by the leader and a read return cycle during which a read return providing the requested read data is returned from the follower to the leader. In at least some embodiments, a read request, e.g., a read request cycle, may be issued and/or otherwise initiated by the leader via a local and/or network communication channel, e.g., a local and/or network bus, in a synchronous manner. Alternatively, or in addition, a read return, e.g., a read return cycle, may be issued and/or otherwise initiated by the follower via the local and/or network communication channel, e.g., the local and/or network bus providing the requested read data in a synchronous manner.

According to the illustrative embodiments, one or more read requests may be issued and/or otherwise initiated without necessarily waiting for the corresponding read returns. For example, a leader device issues a sequential group of read requests according to a post process, in which the read requests are said to be posted, i.e., posted read requests, according to a posted sequence order. It is understood that a group of corresponding read returns may be received in response to the posted read requests and according to a read-return sequence order. It is understood that the read-return sequence order may differ from the posted sequence order, resulting in an out-of-order arrangement. The illustrative devices, systems, processes and software disclosed herein are configured to align, equalize and/or otherwise re-order any such out-of-order arrangements of requested read data resulting from posted read requests.

Unfortunately, read operations incur unavoidable delays, especially in a distributed network, that may vary from address-to-address and/or from cycle-to-cycle, and in at least some applications, from various differing resources. For example, back-to-back, pipelined read commands issued from one lead entity to multiple follower entities may result in out-of-order read returns. This variability may present problems for at least some systems, e.g., deterministic systems. One approach for maintaining deterministic operation is to issue a new read command only after a pending read command has been satisfied. This approach introduces inefficiencies, at least as they relate to delays between the issuance of a read command and satisfaction by a corresponding read return. Other standard hardware and/or software techniques for managing this issue have been recognized to limit performance.

The devices, systems, processes and/or software disclosed herein introduce a self-contained layer that may be positioned between a leader entity and any follower entities, as may be implemented over local bus and/or a distributed network system. The self-contained layer can be configured to send read cycles, accepts read returns that may include out-of-order read returns and return in-ordered read returns. In at least some embodiments, the self-contained layer includes post, push and pop modules configured to respectively implement post, push and pop processes to realize a preferred ordering of out-of-order read returns and to support a processing of posted read commands in a reliable and deterministic manner. This approach allows for an efficient processing of sequential read requests, without having to wait for read confirmation by way of read returns. The disclosed techniques support higher levels of performance, e.g., supporting back-to-back, pipelined read cycles that can include, in at least some embodiments, any combination of posted burst-read cycles, multi-lane support and cycle timeouts. Flow control may be introduced to limit a number of pending read returns and to protect against overflow.

FIG. 1 is a block diagram illustrating an example, non-limiting embodiment of an out-of-order read-return equalization system 100 functioning in accordance with various aspects described herein. Referring to FIG. 1, in one or more embodiments, the out-of-order read-return equalization system 100 includes a leader entity, e.g., a leader entity 101, in communication with a read-write bridge 102 over a local bus 103. The read-write bridge 102 is in further communication with a posted read processing system 104 and one or more follower entities, e.g., follower entities 105*a* . . . 105*n*, generally 105, via a network 106. In at least some embodiments and without limitation, the leader entity 101 and/or one or more of the follower entities 105 can include devices, e.g., processing devices and/or systems, processors, microprocessors, ASICs, hardware threads, network and/or storage elements, and/or processes as may be implemented in firmware and/or software, e.g., according to executable instructions. In at least some embodiments, network communications and/or network data exchanges may be operating according to a network data-exchange protocol, while local bus communications and/or local-bus data exchanges may be operating according to a local-bus protocol. In at least some embodiments, the network 106 may be operating according to the same local-bus protocol as the local bus 103. Alternatively, or in addition, the network 106 may be operating according to a different network data-exchange protocol that differs from the local-bus protocol of the local bus 103. It is understood that there is no requirement that network 106 and the local bus 103 be identical. For example, SEND-BRIDGE STAGE 1 (107*a*) could act as a conversion bridge from the local bus 103 to the network 106 in the same way that RTN-BRIDGE STAGE 1 (107) acts as a return conversion bridge from the network 106 to the local bus 103.

In at least some embodiments, one or more of the follower entities 105 may be in communication with a split return bridge, e.g., including first-stage return bridge 107, e.g., via the network 106 and a second-stage return bridge 108. The first-stage return bridge 107 may be in further communication with the posted read processing system 104. According to the example out-of-order read-return equalization system 100, the first-stage return bridge 107 may operate according to a network data-exchange protocol associated with the network 106. Likewise, the second-stage return bridge 108 may operate according to a local-bus protocol associated with the local bus 103, 103'.

According to the illustrative embodiment, and in more detail, the posted read processing system 104 includes a post process module 110, a push process module 112 and a pop process module 114. The post process module 110 is in communication with the read-write bridge 102 and the pop process module 114. The push process module 112 is in communication with the first-stage return bridge 107 and the pop process module 114. The pop process module 114, in turn, is in communication with the post process module 110, the push process module 112 and the second stage return bridge 108.

In operation, the leader entity 101 may issue a series of read requests directed towards one or more of the follower entities 105 via the local bus 103. In at least some embodiments, the series of read requests may include posted read requests, e.g., in which the leader entity 101 issues a read request without having to confirm any prior and/or pending read requests have been satisfied. For example, the posted read requests may include back-to-back, pipelined read requests. In at least some embodiments, the read-write bridge 102 monitors a status of the post process module 110, such as a full and/or not-full status of the post process module. It is understood that in at least some embodiments, e.g., to any physical realization, that a number of pending read requests, i.e., those read requests for which read returns have not yet provided the requested read data, may be limited according to some maximum number, in which instance, the post process module 110 may provide a full status. The read-write bridge 102 may pause, block and/or otherwise inhibit a read request responsive to detecting a full status from the post process module 110.

In at least some embodiments, the post process module 110 provides a reference identifier, e.g., a tag that may be used to track read returns, to associate read returns with corresponding read requests, and/or to otherwise manage an ordering of read returns. The read-write bridge 102 may be configured to incorporate the tag value with a read request, e.g., by including, appending and/or otherwise combining the tag value with the read request to obtain a tag-modified read request. The read-write bridge 102 may then direct the tag-modified read request towards one or more targeted follower entities 105. The follower entities 105 may respond to any tag-modified read requests as may be necessary according to an address of the read request.

The follower entities 105 may provide read returns to the first-stage return bridge 107, e.g., via the network 106. In at least some embodiments, the read returns include a tag portion providing an indication of a tag of the corresponding tag-modified read request and a requested read data portion providing the requested read data, referred to herein generally as tag-modified read returns. The push process module 112 may temporarily store the tag-modified read returns upon reception from the follower entities 105. It is understood that the tag-modified read returns may be received in an out-of-order fashion according to an order of the posted read requests. In at least some embodiments, the push process module 112 may be configured to temporarily store requested read data portion of the tag-modified read returns according to an index value that corresponds to a tag value portion of the tag-modified read returns. As a result, the push process module 112 may provide an equalization and/or a re-ordering of any out-of-order read returns.

In at least some embodiments, the pop process module 114 may be configured to monitor a status of the push process module 112. For example, the monitored status may relate to a condition of the temporarily stored read returns. In at least some embodiments, e.g., when the pop process module 114 determines that tag-modified read returns are available for an orderly processing, the pop process module 114 may assemble a read return. The pop process module 114 may provide an orderly processed read return to the leader entity 101 via the second stage return bridge 108. Alternatively, or in addition, the pop process module 114 may provide an indication to the post process module 110 and/or the push process module 112 that the orderly processed read return has been provided to the leader entity 101. The post process module 110 and/or the push process module 112 may adjust their respective internal configurations according to completion of a read request, e.g., to clear any temporarily stored information related to pending read requests.

Figure 2:
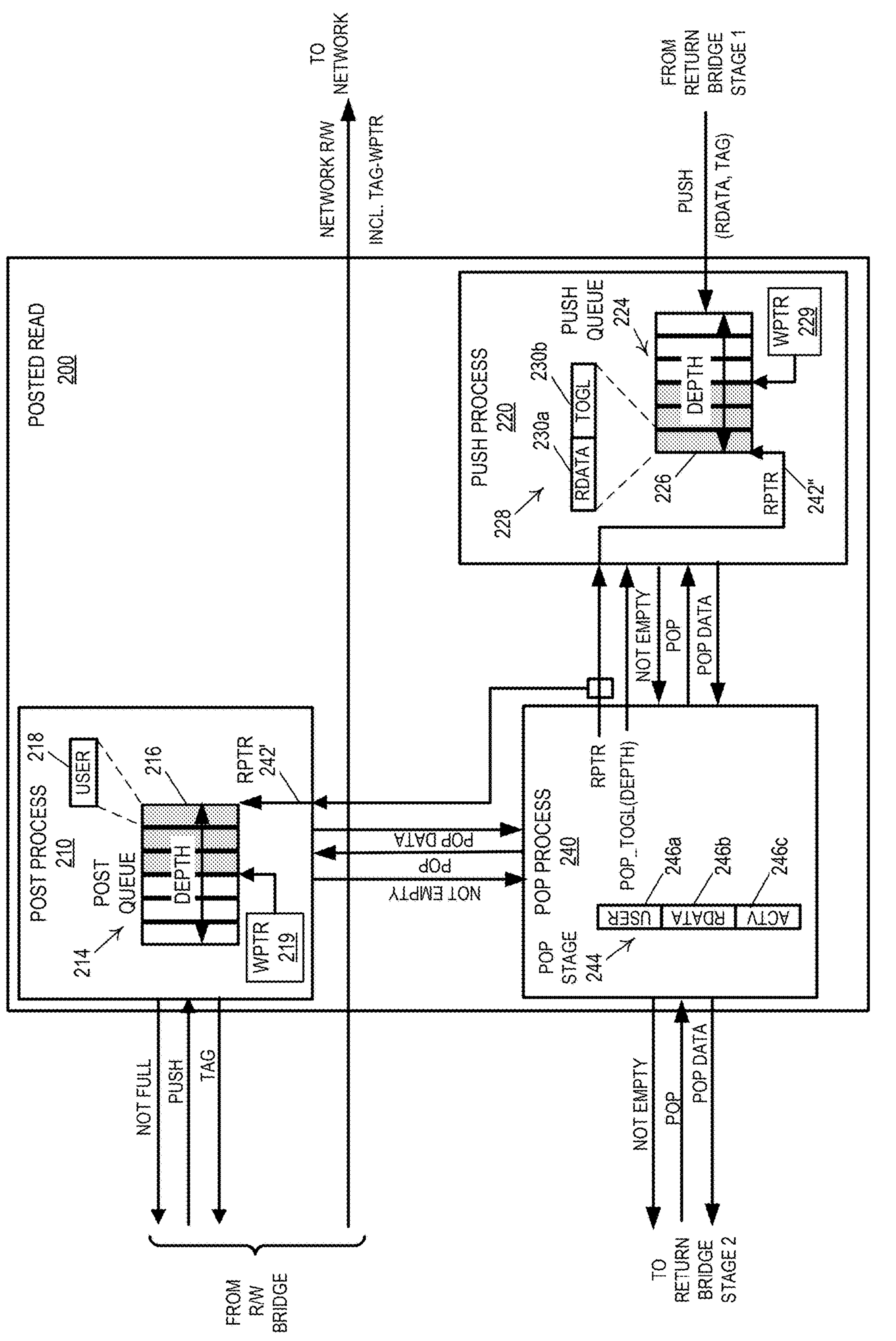
FIG. 2 is a block diagram illustrating an example, non-limiting embodiment of a posted read processing system functioning within the out-of-order read-return equalization system illustrated in FIG. 1, in accordance with various aspects described herein.

FIG. 2 is a block diagram illustrating an example, non-limiting embodiment of a posted read processing system 200 functioning within the out-of-order read-return equalization system 100 illustrated in FIG. 1, in accordance with various aspects described herein. In at least some embodiments, the posted read processing system 200 includes three sub-processes configured to facilitate equalization, e.g., re-ordering, of read returns that may have been received in an order or sequence that differs from a posted sequence order of the posted read requests. In at least some embodiments, the three sub-processes may be independent processes, such as a post process, a push process and a pop process. For example, in one or more embodiments, the posted read processing system 200 includes a post process module 210 configured to implement a post process, a push process module 220 configured to implement a push process and a pop process module 240 configured to implement a pop process.

The post process module 210 includes a post queue 214 including a group of storage elements 216, e.g., consecutive storage elements 216 as may be configured according to a buffer and/or a queue. For example, the storage elements 216 may be configured in memory, a register, a group of registers and/or any other suitable data structure capable of storing information and/or performing any one or more of the various functions disclosed herein. According to the illustrative embodiment, the post queue 214 includes a first-in-first-out (FIFO) queue having a finite depth, e.g., a depth of N storage elements 216—according to the illustrative example, N=6, indicating depth of six storage elements 216 or registers. The size of the storage elements 216 may be determined according to a bit width and/or a word size as may be determined according to data to be stored therein, e.g., the user data. In at least some embodiments, the post process module 210 includes a post-queue write location indicator, e.g., a post-queue write pointer 219 configured to reference a storage element 216, e.g., a next one of the empty and/or otherwise available storage elements 216, into which information related to a next read request may be written. The post-queue write pointer 219 may be adjusted, e.g., incremented, according to subsequently pending read request until it has reached a post queue depth, at which time the post process module 210 may provide an indicator, e.g., adjusting a NOT_FULL indicator to indicate that the post queue 214 is full. Alternatively, or in addition, the post process module 210 includes a post-queue read location indicator, e.g., a post-queue read pointer 242' configured to reference a storage element 216, e.g., a next available one of the written-to and/or otherwise occupied storage elements 216, into which information related to a pending read request may be read from. This may include an earliest posted read in a sequence of posted reads that has not yet been satisfied, i.e., resulted in a user data portion associated with the read request. It is understood that in at least some embodiments, a measure of "fullness" or "emptiness" of the post queue 214 may be determined as a difference between the post-queue read pointer 242' and the post-queue write pointer 219. To the extent the difference is less than a preconfigured buffer depth, i.e., N, a post process of the post process module 210 may be configured to assert and/or otherwise report a NOT_FULL indication. To the extent, however, that the difference is not less than the buffer depth, the post process may be configured to assert a FULL indication, which is understood to include a logical value of the NOT_FULL indication, e.g., taking on a logical TRUE and/or binary value "1" if not full, and a logical value FALSE and/or binary value "0" if full and/or otherwise not empty.

Without limitation, the storage elements 216 may be configured to store any information as may be beneficial to processing of the read requests according to the various techniques disclosed herein. For example, the storage elements 216 may be configured to store user data in a user data field 218 related to a corresponding posted read request. In at least some embodiments, the user information may be related to a protocol, such as a first protocol of a local bus 103 (FIG. 1) and/or a second protocol of a network 106. Such information may be used by one or more of the read-write bridge 102, the first-stage return bridge 107 and/or the second stage return bridge 108 to facilitate operations across different bus and/or network protocols. In at least some embodiments, the storage elements 216 may be configured to store placeholder and/or otherwise non-functional information, e.g., recognizing that a value of the corresponding post-queue write pointer 219 may be utilized according to the illustrative posted read processing without necessarily using any information as may or may not be stored into a corresponding storage element 216 of the post queue 214. For example, the post-queue write pointer 219 may be advanced according to processed read requests with or without storing any information in the corresponding, i.e., pointed to, storage element 216.

In at least some embodiments, the post process module 210 provides a NOT_FULL indicator providing an indication as to whether the post queue 214, having a finite depth, e.g., the example N=6, storage element 216, is full or not full. For example, the read-write bridge 102 (FIG. 1) may monitor the NOT_FULL indicator responsive to a read request issued by the leader entity 101. If the NOT_FULL indicator indicated that the post queue 214 is not full, the read-write bridge 102, responsive to a read request, may issue a read request. In at least some embodiments, issuing the read request may push of information e.g., a writing and/or storing of related user data in the user data field 218 onto a storage element 216 of the post queue 214 as indicated by a current value of the post-queue write pointer 219. In at least some embodiments, the pushed information may have no practical value, other than occupying a location of the post queue 214 associated with a tag value. In at least some embodiments, a value of the post-queue write pointer 219 may be incremented responsive to posting of the read request to obtain a posted read request. In at least some embodiments, a post-queue read pointer 242' may be determined according to a pop operation. For example, the post-queue read pointer 242' may be incremented and/or decremented subsequent to a pop operation, such that the post-queue write pointer 219 points to a next available storage element 216 of the post queue 214, e.g., according to operation of a FIFO buffer.

The post process module 210 may determine a group of reference values, e.g., a group of reference tags or tag values for a group of posted read requests. In at least some embodiments, the reference tags are unique, e.g., corresponding to an order in which the posted read request may have been received and/or otherwise posted according to a placement within the post queue 214. In at least some embodiments, a reference tag, e.g., a unique reference tag, is sent with each read requests and returned with a corresponding read return value. It may be appreciated that the reference tags can facilitate a reordering of any read return values that may have been received out of order. In at least some embodiments, a tag value is based upon a value the post-queue write pointer 219 for a read request posted according to the post process. It is understood that in at least some embodiments, the post-queue write pointer 219 may be incremented relative to a depth of the post queue 214, e.g., varying between a value of 0 to N−1, or from a value of 1 to N, with an understanding that the value of N corresponds to a predetermined and/or otherwise configured depth of the post queue 214. The post process module 210 may provide the tag value to the read-write bridge 102, e.g., in response to a read request received from the leader entity 101, which in turn may append and/or otherwise combine the tag value with the corresponding read request to obtain a tag-modified read request. The leader entity 101 may subsequently issue the tag-modified read request as a network read request directed, via a network, toward a corresponding follower entity 105 (FIG. 1). The follower entity may be indicated by the tag-modified read request, e.g., an address of the tag-referenced read request.

The tag-modified read request may be directed to a targeted one of the follower entities 105 (FIG. 1), which may respond by returning the requested read data. It is understood that more than one tag-modified read requests, directed to one or more follower entities 105 may be pending at any given time, e.g., up to a depth N of the post buffer. It is envisioned that the requested read data may be returned in an un-ordered manner, e.g., in an order that may differ from an order in which the tag-modified read requests may have been issued by the leader entity 101. In at least some embodiments, the follower entities 105 issue tag-modified read returns configured to provide tag-modified read return that includes the requested read data along with a tag value of the corresponding tag-modified read requests. The tag-modified read returns may be directed towards the push process module 220 of the posted read processing system 104, e.g., via the first-stage return bridge 107.

In at least some embodiments, the push process module 220 includes a push queue 224 including a group of storage elements 226, e.g., consecutive storage elements 226 as may be configured according to a buffer and/or a queue structure. According to the illustrative embodiment, the push queue 224 includes a first-in-first-out (FIFO) queue having a finite depth of N storage elements 226. Alternatively, or in addition, the push queue 224 may include a memory, a register and/or collection of registers and/or any other suitable data structure capable of performing the various functions disclosed herein. According to the illustrative embodiment, a depth of the push queue 224 is configured as N=6. According to a posted read process of the posted read system 200, a size or depth of the push queue 224 can be equivalent to a size or depth of the post queue 214. It is understood that a storage size of each memory element, e.g., a bit length and/or word size may differ between the post queue 214 and the push queue 224, despite their having the same depth.

The push process module 220 includes a write location indicator, e.g., a write pointer configured to reference a particular one of the empty and/or otherwise available storage elements 226 of the push queue 238 into which tag-referenced read return data obtained from one of the pending tag-referenced read requests may be written. In at least some embodiments, the read return data of the tag-referenced read return is written into a particular storage element 226 of the push queue 238 determined according to a tag value obtained from the tag-referenced read return. To the extent the tag values reflect an order, e.g., an order in which the posted read requests were associated with locations or positions in the post queue 214, the tag values may be used to rearrange and/or otherwise re-order the read return data from an order in which the tag-referenced read return were received to an order in which the corresponding posted read requests were issued by the leader entity 101.

In at least some embodiments, the push process module 220 includes a push-queue read location indicator, e.g., a push-queue read pointer 242" configured to reference a storage element 226 of the push queue 224 from which read return data, e.g., a requested read data portion of a tag-modified read return, should be returned to the leader entity 101. The push-queue read pointer 242" can be configured to reference a next one of the storage element 226 for returning the read return data. When requested read data has been written into the storage location 226 pointed to by the push-queue read pointer 242", and has not yet been read, the posted read system 200 may be configured to pop read data from the occupied storage element 226 for further processing and return to the requesting leader entity 101.

Without limitation, each storage element 226 of the push queue 224 may be configured to store data returned by a respective one of the follower entities 105 (FIG. 1) responsive to a read request directed to the follower entity 105. For example, the storage elements 226 may be configured to store a requested read data portion of a tag-modified read return as returned data at an indexed location of the push queue 224, wherein the indexed location may be determined according to a tag value portion of the tag-modified read return associated with the corresponding read request. According to the illustrative embodiments, the read return data received and/or otherwise obtained from each of the follower entities 105 includes a respective tag value according to the corresponding read request. For example, an indexed offset and/or location within the push queue 224 may be determined according to the tag value. To the extent that the tag values are assigned according to an ordered arrangement, e.g., according to a posted sequence order, the tag values of the read returns may be used to re-order the read returns according to the posted sequence order, even if the read returns are received in an out-of-order arrangement. According to the illustrative example, a value of a push-queue write location indicator, e.g., a posh-que write pointer 229 may be used as a write pointer pointing to a particular storage element 226 within the push queue 224. Accordingly, the push-queue write pointer 229, based upon the tag value, enables the push queue 224 to be populated in an orderly manner regardless of whatever order the read returns are received and/or otherwise pushed onto the push queue 224.

According to the illustrative embodiment, the storage elements 226 of the push queue 514 may be adapted to store read return information 228. The read return information 228 may include read return data in a read-data field **230*a*. In at least some embodiments, the push process module 220 is configured to determine a toggle value or toggle bit corresponding to receipt of the read return data and to associate the toggle value with the read return data by way of a push toggle bit field 230*b*. The read-data field 230*a* can be stored together with the push toggle bit field 230*b*, within the same storage element 226 having a location in the push queue 224 as determined by the push-queue write pointer 229, which may be determined according to a tag value. A value of the toggle bit field 230*b* may be used to indicate when new read return data in the read-data field 230*a* has been pushed into the storage element 226 of the push queue 224. Accordingly, the push toggle bit field 230*b* can be set and/or otherwise toggled to indicate that the corresponding storage element 226 is no longer empty, but contains read return data. In at least some embodiments, the values of the push toggle bit field 230*b* may be initialized to a common value, e.g., a '1' or a '0' and then toggled as read return data is pushed into a corresponding storage element 226 of the push queue 224**.

The read return data may be pushed onto the push queue 224 by way of the push-queue write pointer 229, as the tag-modified read returns are received. Understanding that the tag-modified read returns may be received in an out-of-order sequence that differs from the posted sequence order, the storage elements 226 of the push queue 224 may be filled with requested read data as the tag-modified read returns are received. In at least some embodiments, the push queue 224 has the same depth as the post queue 214 and the push-queue read pointer 242" is configured to read from a location in the push queue 224 corresponding to a location in the post queue 214 pointed to by the post-queue read pointer 242'. For example, the push-queue read pointer 242" points to the oldest pending posted read request, e.g., corresponding to a first in location of the example FIFO structure. Likewise, the post-queue read pointer 242' points to a location of the oldest pending read return, e.g., corresponding to a first in location of the example FIFO structure. As the push queue 224 may be filled out-of-order, the push-queue read pointer 242' may reference an empty location, while other locations of the push queue 224 may be not empty. Nevertheless, when read return data has been written to the storage element 226 of the push queue 224 pointed to by the push-queue read pointer 242", it is available to be extracted, e.g., popped from the push queue 224.

In at least some embodiments, the push process module 220 provides a NOT_EMPTY indicator providing an indication as to whether the push queue 224 having a finite depth is empty or not empty. For example, the pop process module 240 may monitor the NOT_EMPTY indicator and, to the extent the NOT_EMPTY indicator indicated that the storage location 226 pointed to by the push-queue read pointer 242", e.g., representing the read return data of the next pending posted read request according to the posted sequence order is not empty, the pop process module 240 may issue a pop command to pop and/or otherwise transfer read return data from the read-data field 230*a*. Similarly, the post process module 210 provides a NOT_EMPTY indicator to the pop module 240 indicating whether the post queue 214 having a finite depth is empty or not empty. For example, the pop process module 240 may monitor the NOT_EMPTY indicator and, to the extent the NOT_EMPTY indicator indicated that the storage element 216 pointed to by the post-queue read pointer 242', e.g., representing the read request of the next pending posted read request according to the posted sequence order is not empty, the pop process module 240 may issue a pop command to pop and/or otherwise transfer user data from the storage element 216 of the post queue 214 pointed to by the post-queue read pointer 242'. In at least some embodiment, the pop process module 240 controls the post-queue read pointer 242' and the push queue read pointer 242".

For example, the pop process module 240 may assert a first pop command to the push process module 220 in combination with the push-queue read pointer 242" pointing to a storage element 226 from which returned data is to be obtained. The first pop command causes the read return data stored in the read-data field 230 of the storage element 226 pointed to by the push-queue read pointer 242" to be transferred to the pop process module 240 as popped read return data and the push-queue read pointer 242" to be incremented to a next storage element 226 of the push queue 224. In this manner, the read return data may be returned to the leader entity 101 according to an order in which the read requests were issued. If a particular storage element 226 pointed to by the incremented push-queue read pointer 242" has not been populated yet, the push process module 220 will not assert a NOT_EMPTY indicator. Accordingly, the pop process module 240 can refrain from asserting the pop command until the NOT_EMPTY indicator indicates that the corresponding storage element 226 is not empty, i.e., it has been populated by returned data of a read return.

According to the illustrative posted-read embodiment, the depths of the post queue 214 and the push queue 224 are the same, such that the push-queue read pointer 242" corresponds to the post-queue read pointer 242', e.g., both pointing to a similarly indexed location within their respective post and push queues 214, 224.

In at least some embodiments, the post process module 210 provides a NOT_EMPTY indicator providing an indication as to whether the storage element pointed to by the post-queue read pointer 242' is not empty, e.g., contains user data in the user data field 218 associated with a particular read request command. For example, the pop process module 240 may monitor the NOT_EMPTY indicator and to the extent the NOT_EMPTY indicator indicated that the particular storage element 216 not empty, the pop process module 240 may issue a pop command to pop and/or otherwise transfer the user data in the user data field 218 from the post queue 214 to the pop process module 240. For example, pop process module 240 may assert a second pop command to the post process module 210 in combination with a post-queue read pointer 242' pointing to a storage element 216 from which user data in the user data field 218 associated with a corresponding pushed storage element 226 of the push queue 224 is to be obtained. The second pop command causes the user data in the user data field 218 to be transferred to the pop process module 240 as second pop data and the post-queue read pointer 242' to be incremented to a next storage element 216 of the post queue 214. In this manner, the pop process module 240 may combine read return data with the corresponding user data in the user data field 218, e.g., in a pop stage register and/or buffer 244, and return a content of the pop stage buffer 244 to the leader entity 101 as read return data, according to an order in which the read requests were issued. If a particular storage element 216 pointed to by the incremented post-queue read pointer 242' has not been populated yet, the post process module 210 will not assert a NOT_EMPTY indicator. Accordingly, the pop process module 240 can refrain from asserting the pop command until the NOT_EMPTY indicator indicates that the corresponding storage element 216 is not empty, i.e., it has been populated by user data of a posted read command. In at least some embodiments, the pop process module 240 generates an active indicator or bit 246*c* that may be used to signal an availability of read return data in the pop stage buffer 244.

In at least some embodiments, the pop process module 240 asserts a NOT_EMPTY indicator providing an indication to the second stage return bridge 108 that the pop stage buffer 244 is not empty. In response to the pop stage buffer 244 being not empty, the second stage return bridge 108 asserts a pop command causing the pop process module 240 to provide pop data obtained from the pop stage buffer 244, e.g., including the user information 246*a*, the return data 246*b* and, in at least some embodiments, an active bit 246*c*. The second stage return bridge 108 may be configured to apply the user data 246 to the returned data 246*b* to obtain adjusted returned data suitable for consumption by the leader entity 101. For example, the second stage return bridge 108 may perform a protocol conversion according to the user information 246*a*.

In at least some embodiments, a user may specify a depth of the post and push queues as may determine a maximum number of posted reads pending at any given time. Alternatively, or in addition a user may specify one or more of a user width and/or a data width. The user width may indicate a bit width of a user field, e.g., the example user data field 218, in an of the example queues, e.g., the post queue 214. Likewise, a data width may indicate a bit width of a read-data field, e.g., the example read-data field 230*a*, in an of the example queues, e.g., the push queue 224.

In at least some embodiments, the post process module 210 interfaces to the local to network read-write bridge 102 and manages the post queue 214. According to the illustrative example, and without limitation, the post queue 214 is a conventional circular FIFO supporting FULL, EMPTY status and PUSH, POP operations. A maximum number of pending read returns is equal to a depth of the post queue 214. By way of example, a local read cycle triggers a NOT_FULL check. If/when the post queue 214 is not full, data is pushed into the post queue 214, a network read cycle is launched tagged with the current post queue element push address, e.g., a tag determined according to the post-queue write pointer 219. The post-queue write pointer 219 is then incremented. For example, the post-queue write pointer 219 is by '1' in a modulo fashion according to the depth of the post queue 214: WPTR=(WPTR+1) % DEPTH. In at least some embodiments, a push data function to an entry or storage element 216 of the post queue 214 may contain application specific USER information. This information can be stored and used by the return bridge, e.g., the first-stage return bridge 107 or second-stage return bridge 108 to convert network read return cycles to local read return cycles. For example if the local bus 103 operates according to a first protocol, e.g., AXI3, the storage element 216 of the post queue 214 could contain an AXI3_ID.

The pop process module 240 monitors the post queue 214, the push queue 224 and controls a value of the pop stage ACTV bit 246*c* as may be provided to the second-stage return bridge 108. When the pop stage buffer 244 is empty, or is being popped, there is a pending read in the post queue 214 and there is corresponding NOT_EMPTY entry in the push queue 224, the pop process module 240 processes, e.g., pops the post and push queues 214, 224, assembles the read return information and pushes it into the pop stage buffer 244. The first stage return bridge 108 pops data from the pop stage buffer 244 and presents it as a read return cycle on the local bus 103.

According to the illustrative example, the pop process module 240 controls a read address (RPTR) of the post queue 214. In at least some embodiments pop process module 240 also contains a corresponding pop toggle bit corresponding to a push toggle bit field 230*b* for each PUSH_TOGL bit of the push queue 224. Further according to the illustrative example, a push element[k] of the push queue 224 is not empty when a corresponding pop toggle bit POP_TOGL[k]!=PUSH_TOGL[k]. A post pop operation reads the information at post element identified by a value of the post-queue read pointer 242', read pointer[RPTR], increments RPTR, e.g., by a value of 1, in a modulo sense according to a depth of the push queue 224: RPTR=(RPTR+1) % DEPTH, and toggles POP_TOGL[RPTR] to equal PUSH_TOGL[RPTR] and set the push element to empty.

In at least some embodiments, a NOT_EMPTY check in the post process module 210 limits a number of pending read return cycles to a depth of the post and push queues 214, 224 and prevents overflow. A NOT_FULL check for the push queue 224 in the push process module 220 can detect erroneous read return cycles. In at least some embodiments, the pop process module 240 can support a POP_FLUSH operation, which can be used to empty the post and push queues 214, 224 and restart when, for example, the read-write bridge 102 and/or the first-stage return bridge 107 and/or the second-stage return bridge 108 detects a timeout. For example, values of the storage entries 216 in the post que 214 and/or the storage entries 226 in the push queue 224 may be set to all '1's and/or all '0's, e.g., to clear the storage entries 216, 226.

Figure 3:
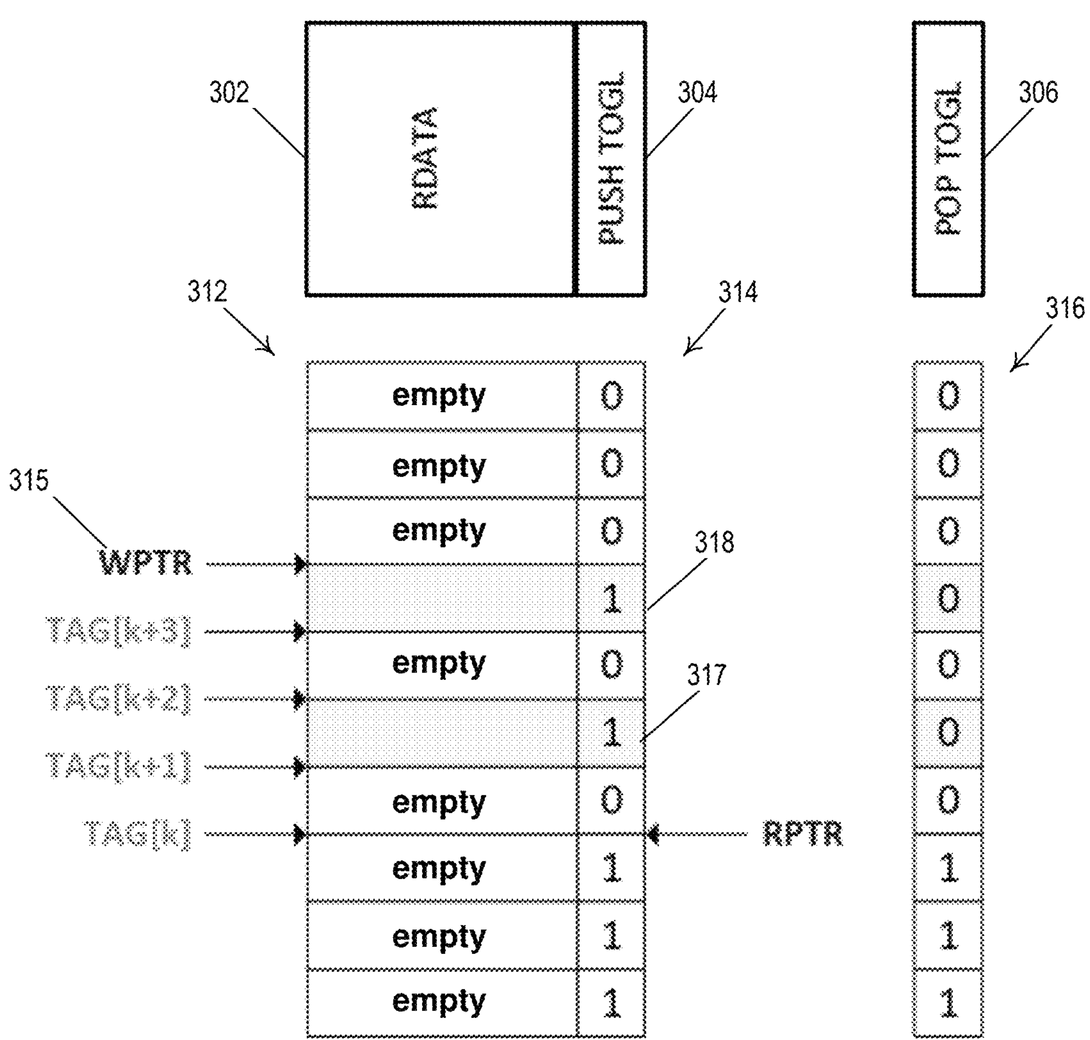
FIG. 3 is a schematic diagram illustrating an example, non-limiting embodiment of read return information as may be obtained by the example posted read processor illustrated in FIG. 2, in accordance with various aspects described herein.

FIG. 3 is a schematic diagram illustrating an example, non-limiting embodiment of read return information 300 as may be obtained by the example posted read processing system 200 illustrated in FIG. 2, in accordance with various aspects described herein. Referring to FIG. 3, in one or more embodiments, the read return information 300, e.g., as may be pushed onto the push queue 224 (FIG. 2), includes a returned data portion 302 and a push toggle indicator portion 304. According to the illustrative embodiment, this returned data portion 302 has ten available read return data locations 312 configured for storing read return data and/or related tag information. The push toggle indicator portion 304 also has ten available push-toggle locations 314 corresponding to the read return data locations 312.

In operation, each of the ten available push-toggle locations 314 includes a respective toggle bit that may be toggled between states, e.g., between '0' and '1' upon a push operation of the read return data into a corresponding returned data location 312, e.g., into a storage element 226 of the push queue 224 (FIG. 2). Read return data may be stored in the read return data locations 312 according to a write pointer 315. In at least some embodiments, a value of the write pointer may be determined according to a tag value returned with the returned data. According to the illustrative example, first returned data is written into a fifth location 317 of the available read return data locations 312, while second returned data is written into a seventh location 318 of the available read return data locations 312. The push toggle value for each of the fifth location 371 and seventh location 318 is toggled from an empty state, e.g., from a binary '0' to a binary '1' indicating, e.g., (RDATA Rdy), that returned data has been pushed onto the push queue 224, e.g., written in the corresponding read return data locations 312.

In at least some embodiments, the read return information 300 can be associated with a pop toggle indicator portion 306. According to the illustrative embodiment, the pop toggle indicator portion 306 also has ten available pop toggle locations 316 corresponding to the read return data locations 312 and the push-toggle locations 314. In operation, each of the ten available pop toggle locations 316 includes a respective toggle bit that may be toggled between states, e.g., between '0' and '1' upon a popping of read return data from the push queue 224 (FIG. 2). Accordingly, once the returned data has been popped for any of the corresponding read return data locations 312, the pop toggle value of the ten available locations 316 is toggled to a value corresponding to a corresponding push toggle value in one of the ten available push-toggle locations 314. For example, the push toggle values in the example ten available push-toggle locations 314 are equivalent to the pop toggle values of the ten available locations 316 for all empty read return data locations 312. However, the push toggle values of the fifth location 317 and seventh locations 318, which are not empty, have different push toggle values of the push-toggle locations 314 and pop toggle values of the ten available locations 316. A value of a push-toggle location 314 may be changed and/or otherwise toggled by the push process module 220 (FIG. 2), e.g., from a logical FALSE to a logical TRUE, from a binary '0' to a binary '1' and vice versa, as the case may be, when read return data is pushed into a corresponding return data location 312. Likewise, a value of a pop-toggle location 314 may be changed and/or otherwise toggled, e.g., by the pop process module 240 or the push process module 220, from a logical FALSE to a logical TRUE, from a binary '0' to a binary '1' and vice versa, as the case may be, when read return data is popped from a corresponding return data location 312. For example, a comparison of the push toggle values of the push-toggle locations 314 and the pop toggle values of the ten available locations 316 can be used to determine whether corresponding read return data locations 312 are empty or loaded with returned data.

Figure 4:
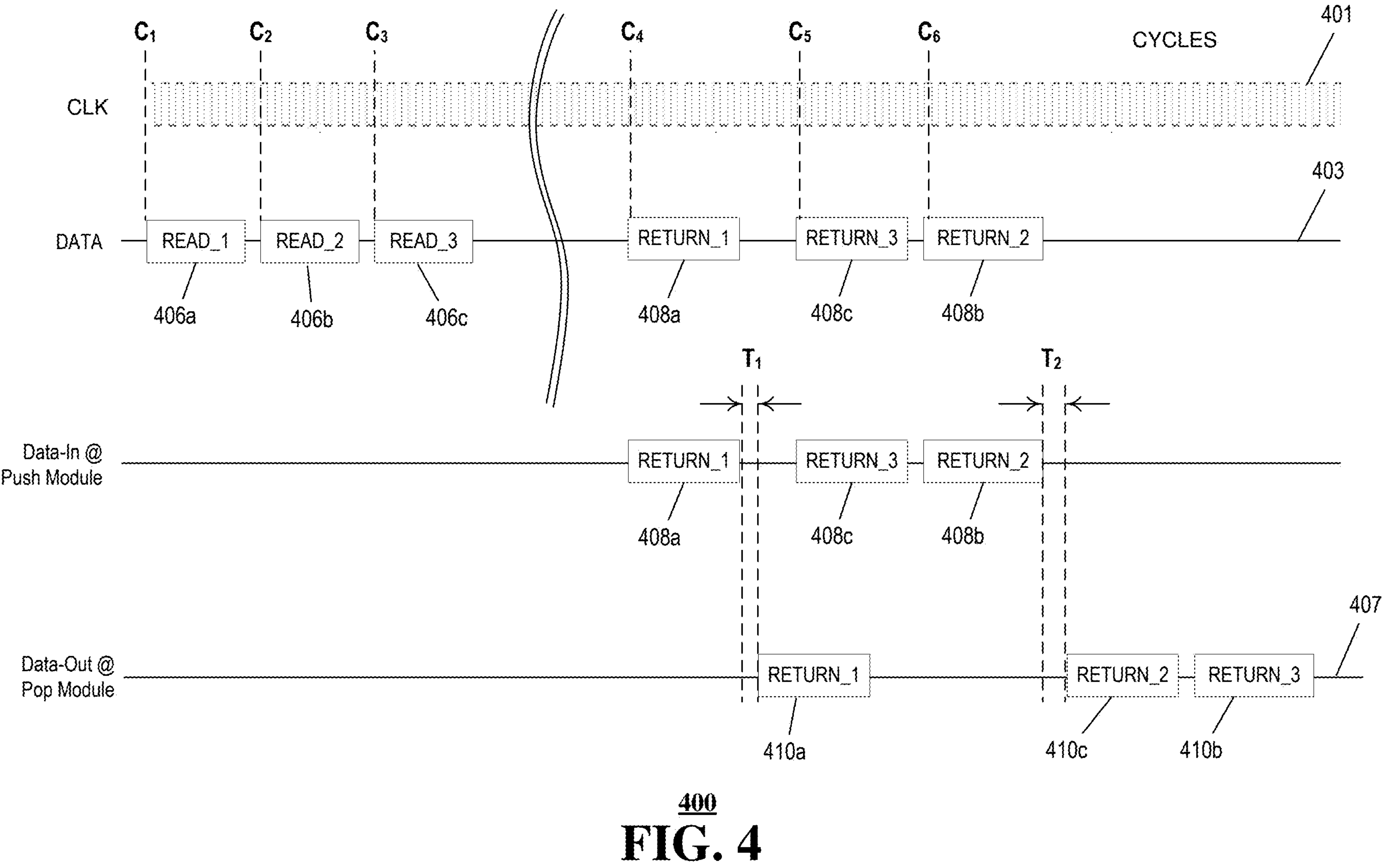
FIG. 4 is a timing diagram illustrating an example, non-limiting embodiments of stored out-of-order read-return data as may be managed by the example posted read processor illustrated in FIG. 2, functioning in accordance with various aspects described herein.

FIG. 4 is a timing diagram illustrating an example, non-limiting embodiment of stored out-of-order read-return data as may be managed by the example posted read processor illustrated in FIG. 2, functioning in accordance with various aspects described herein. Referring to FIG. 4, in one or more embodiments, an example timing diagram 400 illustrates an example out-of-order equalization of posted read commands. According to the illustrative example, the timing diagram 400 includes a timing reference, e.g., a clock 401 and data 403 as may be used in a communication system, such as the example local bus 103 (FIG. 1). A first posted read command 406*a* is issued by a leader at a first reference clock cycle $C_1$ requesting read information from a follower. At some number of clock cycles later, a second posted read command 406*b* is issued at a second reference clock cycle $C_2$ and a third posted read command 406*c* is issued at yet a third reference clock cycle $C_3$ occurring some number of clock cycles after the second reference clock cycle. It is understood that in general, the followers 105 (FIG. 1) of posted read commands may be the same entities, different entities or some combination of both. The entities, e.g., follower entities 105, may include, without limitation, devices, e.g., processing devices and/or systems, processors, microprocessors, ASICs, hardware threads, network and/or storage elements, and/or processes as may be implemented in firmware and/or software, e.g., according to executable instructions A reference to the posted read commands 406*a*, 406*b*, 406*c*, generally 406, being posted refers to issuance of subsequent read commands by the leader without regard to the status of any corresponding read return commands. Namely, a subsequent read command may be issued while a prior read command is still pending. Traditional read commands in a deterministic system may be issued in such a manner that subsequent read commands are withheld and/or otherwise delayed until after some form of confirmation that a pending read request has been satisfied and/or otherwise timed out. The techniques disclosed herein provide techniques to manage read return commands, e.g., to order and/or otherwise equalize the read return commands to enhance throughput, to reduce processing delays, and/or to otherwise provide an overall efficiency improvement to utilization of system resources, e.g., processor cycles, bus cycles, and the like.

Continuing with the illustrative example, a first read-return command 408 returns data requested by the first posted read command 406*a* at a fourth time point, e.g., at clock cycle $C_4$. Similarly, a third read-return command 408*c* returns data requested by the third posted read command 406*c* at a fifth time point, e.g., at clock cycle $C_5$ and a second read-return command 408*b* returns data requested by the second posted read command 406*b* at a fifth time point, e.g., at clock cycle $C_5$. According to the illustrative example, the time points, e.g., clock cycles, are such that $C_5>C_4>C_3$. Accordingly, the second and third read-return commands are received out of order with respect to an ordering of the posted read commands 406.

In at least some embodiments, data from the read-return commands may be received in a data portion of a communication channel, e.g., the network 106 (FIG. 1) and/or a bus, such as the local bus 103 for local reads and/or some other system bus, by the push process module 220 (FIG. 2) in the order received, which may not correspond to an order in which the posted read commands 406 were issued. According to the equalizing and/or ordering techniques disclosed herein, data from the read-return commands 410*a*, 410*b*, 410*c*, generally 410 may be provided at an output 407 of. It is understood that an ordering at which the read-return commands 408*are* received at the push module may differ from an ordering, e.g., a posting order of their corresponding read commands 406. However, according to the techniques disclosed herein, the posted read system rearranges the read-return commands 408 to obtain rearranged ordered read-return commands 410 that correspond to the posting order of the corresponding read commands 406. In at least some embodiments, the ordering of the read-return commands provided at the output 407, e.g., to the requesting leader entity 101, may be equivalent, such that an ordering of the returned data may correspond to an ordering of the posted read commands 406.

In at least some embodiments, extended information may be added to a posted read command to facilitate any re-ordering of read-return commands as may be necessary. For example, the extended information may be added in the form of user bits and/or a tag identifier. By way of example, extended information in the form of reference values, e.g., tag identifier bits, may be added to posted burst-read requests or commends, with the added reference values corresponding to an order of a series of posted burst-read requests. The extended information may be passed along with the posted read command to targeted follower entities and returned by the follower entities in corresponding read-return commands providing data requested by the posted read commands. In at least some embodiments, the extended information, e.g., the reference values and/or tag identifier bits may be received with the read-return data, which may be used to rearrange the read-return data as may be necessary to correspond with a preferred ordering, e.g., an ordering of the associated posted read commands.

It is understood that in at least some embodiments, data from the read return commands is loaded into a read-return queue before being provided for reading, e.g., by the leader entity 101. In at least some embodiments, the read-return queue may report a status indication that may be used to determine when the read-return queue is ready for reading the returned data. For example, the status indication may be in the form of a "queue empty" status indicator or bit. In at least some embodiments, the queue empty status indicator may remain at an empty indication while data is being loaded into the read-return queue from read return commands, with a change in status, i.e., indicating the read-return queue is no longer empty, occurring according to a rule or policy. For example, the queue empty status indicator may remain empty until all data is ready at the read-return queue. Alternatively, or in addition, the queue empty status indicator may transition from empty to not empty at some point before all the data has been loaded into the read-return queue, e.g., to permit reading from the read-return queue when a particular queue level is reached, but before all the data has been loaded into the read-return queue in an orderly fashion.

In at least some embodiments, such a rule or policy may be selected and/or otherwise altered by a user to permit different read behavior of the read-return queue. This permits a readout behavior of the read-return queue to be selected according to one or more of a user preference, a data type, a leader and/or a follower, and/or any other user data as may be utilized within the posted read request and/or read return commands. To the extent the readout behavior is provided in the user data portion of a posted read request, it may be obtained from a post process module 210 (FIG. 2) by association with a tag identifier, such that a behavior of the push process module 220 and/or the pop process module 240 may be configurable to at least some degree based on user input and/or the user data associated with the posted read command.

Figure 5:
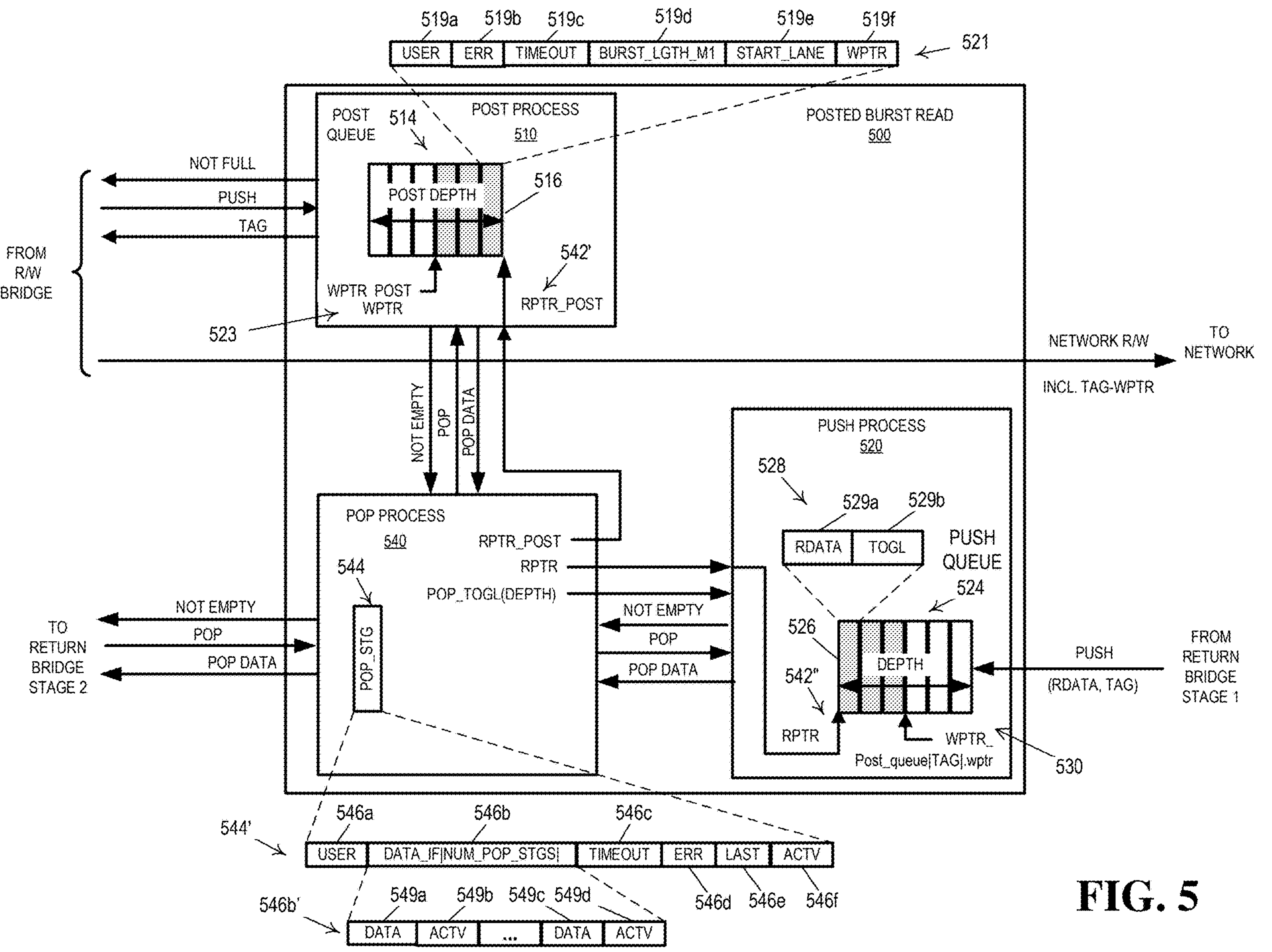
FIG. 5 is a block diagram illustrating an example, non-limiting embodiment of a posted burst-read processing system functioning within the out-of-order read-return equalization system illustrated in FIG. 1, in accordance with various aspects described herein.

FIG. 5 is a block diagram illustrating an example, non-limiting embodiment of a posted burst-read system 500 functioning within the out-of-order read-return equalization system 100 illustrated in FIG. 1, in accordance with various aspects described herein. The example posted burst-read system 500 builds on the basic posted read structure disclosed herein and adds support for burst-read operation in which a single burst-read request may result in multiple read returns, e.g., returning the requested read data over multiple cycles of a deterministic system. In at least some embodiments, the posted burst-read processing system 500 includes three sub-processes configured to facilitate equalization, e.g., re-ordering, of posted burst-read returns that may have been received in an order or sequence that differs from a read sequence order of the posted burst-read requests. In at least some embodiments, the three sub-processes may be independent processes, such as a post process, a push and a pop processes. According to the posted burst-read operation, a one-to-one matching between the post and push queues 214, 224 (FIG. 2) is dropped and an additional push write pointer is added. Referring to FIG. 5, in one or more embodiments, the posted burst-read system 500 includes a post process module 510 configured to implement a burst-read post process, a push process module 520 configured to implement a burst-read push process and a pop process module 540 configured to implement a burst-read pop process.

The post process module 510 includes a post queue 514 including a group of post-queue storage elements 516, e.g., consecutive storage elements 516 as may be configured according to a buffer and/or a queue. The post queue 514 may include a memory, a register and/or collection of registers and/or any other suitable data structure capable of performing the various functions disclosed herein. According to the illustrative embodiment, the post queue 514 includes a first-in-first-out (FIFO) queue having a finite depth, e.g., a depth of N post-queue storage elements 516—according to the illustrative example, the value of N is six (6) indicating six storage elements or registers. The size of the storage elements 516 may be determined according to a bit width and/or a word size as may be determined according to data to be stored therein, e.g., the user data. In at least some embodiments, the post process module 510 includes a post-queue write pointer 523 configured to reference a storage element 516, e.g., a next one of the empty and/or otherwise available post-queue storage elements 516 into which information related to a next burst-read request may be written. The post-queue write pointer 523 may be adjusted, e.g., incremented, according to burst lengths of subsequently pending burst-read requests until it has reached a post queue depth, at which time the post process 510 may adjust a NOT_FULL indicator to indicate that the post queue 514 is full. Alternatively, or in addition, the post process module 510 includes a post-queue read pointer 542' configured to reference a storage element 516, e.g., a next available one of the written-to and/or otherwise occupied post-queue storage elements 516 into which information related to a pending read request may be read from. This may include an earliest posted burst-read request in a sequence of posted burst-read requests that has not yet been satisfied, i.e., resulted in a user data portion associated with the posted burst-read request. It is understood that in at least some embodiments, a measure of "fullness" or "emptiness" of the post queue 514 may be determined as a difference between the post-queue read pointer 542' and the post-queue write pointer 519. To the extent the difference is less than a preconfigured buffer depth, i.e., N, a post process of the post process module 510 may be configured to assert and/or otherwise report a NOT_FULL indication. To the extent, however, that the difference is not less than the buffer depth, the post process may be configured to assert a FULL indication, which is understood to include a logical value of the NOT_FULL indication, e.g., taking on a logical TRUE and/or binary value "1" if not full, and a logical value FALSE and/or binary value "0" if full and/or otherwise not empty.

Without limitation, the post-queue storage elements 516 may be configured to store any information as may be beneficial to processing of the posted burst-read requests according to the various techniques disclosed herein. For example, the post-queue storage elements 516 may be configured to store posted burst-read request related information 521 in one or more post queue element field related to the corresponding posted burst-read request. In at least some embodiments, the posted burst-read request related information 521 of the post-queue element fields may include one or more of user information in the user information field 519*a*, error indicator in the error indicator field 519*b*, a timeout indicator in a timeout indicator field 519*c*, a burst length indicator in a burst length indicator field 519*d*, a start lane field 519*e* and/or a write pointer field 519*f*, referred to generally as post-queue element fields 519.

The user information 519*a* may be related to a protocol, such as a first protocol of a local bus 103 (FIG. 1) and/or a second protocol of a network 106. Such information may be used by one or more of the read-write bridge 102, the first-stage return bridge 107 and/or the second-stage return bridge 108 to facilitate operations across different bus and/or network protocols. The error indicator field 519*b*, e.g., indicating an error status. The timeout indicator field 519*c* may include a timeout value, e.g., a duration and/or threshold of a timeout period. For example, the timeout value or timeout period may be indicated in seconds and/or clock cycles, e.g., if a posted burst-read return has not been received and/or popped within timeout period, an error may be determined and/or otherwise indicated and, in at least some embodiments, the post and/or push queues flushed and/or otherwise reset. The burst length indicator 519*d* indicates a burst-read length of the associated posted burst-read command. It is envisioned that the burst length may be indicated in cycles for a deterministic system, e.g., a posted burst-read requesting data that would be returned over three read-return cycles. The start lane indicator 519*e* may indicate a corresponding starting data lane for multi-lane data exchanges. The write pointer 519*f* may include a representation of the post-queue write pointer 523.

In at least some embodiments, the post process module 510 provides a NOT_FULL indicator providing an indication as to whether the post queue 514 having a finite depth, e.g., the example N=6, storage elements 516, is full or not full. For example, the read-write bridge 102 (FIG. 1) may monitor the NOT_FULL indicator responsive to a read request issued by the leader entity 101. If the NOT_FULL indicator indicated that the post queue 514 is not full, the read-write bridge 102, responsive to a read request, may push of information e.g., a writing and/or storing of posted burst-read request related information 521 onto a post-queue storage element 516 of the post queue 514 as indicated by a current value of the post-queue write pointer 523. In at least some embodiments, the pushed information may have no practical value, other than occupying a location of the post queue 514 associated with a tag value. In at least some embodiments, a value of the post-queue write pointer 523 may be incremented responsive to the read request. In at least some embodiments, a post-queue read pointer 542' may be determined according to a pop operation. For example, the post-queue read pointer 542' may be incremented and/or decremented subsequent to a pop operation, such that the post-queue write pointer 523 points to a next available post-queue storage element 516 of the post queue 514.

The post process module 510 may determine a group of reference values, e.g., a group of reference tags or tag values for a group of posted read requests. In at least some embodiments, the reference tags are unique, e.g., corresponding to an order in which the posted burst-read request may have been received and/or otherwise posted according to a placement within the post queue 514. In at least some embodiments, a reference tag, e.g., a unique reference tag, is sent with each read requests and returned with a corresponding read return value. It may be appreciated that the reference tags can facilitate a reordering of any read return values that may have been received out of order. In at least some embodiments, a tag value is based upon a value the post-queue write pointer 523 corresponding to the push operation for a posted burst-read request posted according to the post process. It is understood that in at least some embodiments, the post-queue write pointer 523 may be incremented relative to a depth of the post queue 514, e.g., varying between a value of 0 to N−1, or from a value of 1 to N, with an understanding that the value of N corresponds to a predetermined and/or otherwise configured depth of the post queue 514. The post process module 510 may provide the tag value to the read-write bridge 102, e.g., in response to a read request received from the leader entity 101, which in turn may append and/or otherwise combine the tag value with the corresponding read request to obtain a tag-modified burst-read request. The leader entity 101 may subsequently issue the tag-modified burst-read request as a network read request toward a corresponding follower entity 105 (FIG. 1) as may be indicated by an address of the tag-referenced burst-read request.

The tag-modified burst-read request may be directed to a targeted one of the follower entities 105 (FIG. 1), which may respond by returning the requested read data over a number of cycles according to the burst value. It is understood that more than one tag-modified burst-read requests, directed to one or more follower entities 105 may be pending at any given time, e.g., up to a depth N of the post buffer or post queue 516. It is envisioned that the requested burst-read data may be returned in an un-ordered manner, e.g., in an order that may differ from an order in which the tag-modified burst-read requests may have been issued by the leader entity 101. However, it can be assumed that an order of the burst for any given burst-read request will be preserved. In at least some embodiments, the follower entities 105 issue tag-modified burst-read returns configured to provide tag-modified burst-read return that includes the requested burst-read data along with a tag value of the corresponding tag-modified burst-read requests. The tag-modified burst-read returns may be directed towards the push process module 220 of the posted read processing system 104, e.g., via the first-stage return bridge 107.

In at least some embodiments, the push process module 520 includes a push queue 524 including a group of storage elements 526, e.g., consecutive storage elements 526 as may be configured according to a buffer and/or a queue structure. Alternatively, or in addition, the push queue 224 may include a memory, a register and/or collection of registers and/or any other suitable data structure capable of performing the various functions disclosed herein. According to the illustrative embodiment, the push queue 524 includes a tag addressable write/read system or queue having a finite depth, e.g., M storage elements 526 according to the illustrative embodiment, understanding that M may not equal N for burst-read requests. More likely, M>N and can be determined according to a maximum number of outstanding burst-read return cycles as may be accommodated by the push queue 524. It is understood that a storage size of each memory element 526, e.g., a bit length and/or word size may differ between the post queue 514 and the push queue 524.

The push process module 520 includes a push-queue write pointer 530 configured to reference a particular one of the empty and/or otherwise available storage elements 526 of the push queue 524 into which tag-referenced burst-read return data obtained from one of the pending tag-referenced burst-read requests may be written. In at least some embodiments, the burst-read return data of the tag-referenced burst-read return is written into a particular storage element 526 of the push queue 524 determined according to a tag value obtained from the tag-referenced read return, and a burst sequence reference of the burst value of the burst-read return, e.g., a second read cycle of a burst-read request identifying a burst value, level depth of 3. To the extent the tag values reflect an order, e.g., an order in which the posted burst-read requests were associated with locations or positions in the post queue 514, the tag values may be used to rearrange and/or otherwise re-order the read return data from an order in which the tag-referenced read return were received to an order in which the corresponding posted read requests were issued by the leader entity 101. The push-queue write pointer 530 is adjusted according to corresponding burst values to ensure sufficient storage locations 526 are reserved for the expected number of burst-read returns associated with the particular posted burst-read request.

In at least some embodiments, the push process module 520 includes a push-queue read pointer 542" configured to reference a storage location 526 of the push queue 524 from which read return data, e.g., a requested read data portion of a tag-modified read return, should be returned to the leader entity 101. The push-queue read pointer 542" can be configured to reference a next one of the storage locations 526 for returning the burst-read return data. When requested burst-read data has been written into the storage location 526 pointed to by the push-queue read pointer 542", and has not yet been read, the posted burst-read system 500 may be configured to pop read data from the occupied storage elements 52 for further processing and return to the requesting leader entity 101. 6.

Without limitation, each storage elements 526 of the push queue 524 may be configured to store data returned by a respective one of the follower entities 105 (FIG. 1) responsive to a burst-read request directed to the follower entity 105. For example, the storage elements 526 may be configured to store a requested burst-read data portion of a tag-modified burst-read return as returned data at an indexed location of the push queue 524, wherein the indexed location may be determined according to a tag value associated with the corresponding read request command and a burst sequence order of a corresponding burst-read return length. According to the illustrative embodiments, the burst-read return data received and/or otherwise obtained from each of the follower entities 105 includes a respective tag value according to the corresponding read request. In at least some embodiments, a burst sequence order number is not necessary, as it can be assumed that the burst order is preserved in the burst-read returns. For example, an indexed offset and/or location within the push queue 524 may be determined according to the tag value. In at least some embodiments, a burst-read return can be entered into a first "empty" storage location at or immediately following a location indicated by the push-queue write pointer 530. According to the illustrative example, a value of the push-queue write pointer 530 may be used as a write pointer pointing to a particular storage element 526 within the push queue 524.

Accordingly, the push-queue write pointer 530, based upon the tag value, enables the push queue 524 to be populated in an orderly manner regardless of whatever order the read returns are received and/or otherwise pushed onto the push queue 524.

According to the illustrative embodiment, the storage elements 526 of the push queue 524 may be adapted to store burst-read return information 528. The burst-read return information 528 may include a read return data field 529*a*. In at least some embodiments, the push process module 220 is configured to determine a toggle value or toggle bit corresponding to receipt of the burst-read return data and to associate the toggle value with the burst-read return data by way of a push toggle bit field 529*b*. The read-return data field 529*a* can be stored together with the push toggle bit field 529*b*, within the same storage element 526 having a location in the push queue 524 as determined at least in part by the push-queue write pointer 530, which may be determined according to a tag value, and a first empty storage element 526 following a location indicated by the push-queue write pointer 530 and not greater than a number of bursts expected for the particular burst-read request. A value of the push toggle bit field 529*b* may be used to indicate when new read return data 529*a* has been pushed into the storage element 526 of the push queue 524.

The burst-read return data may be pushed onto the push queue 524 by way of the push-queue write pointer 530, as the tag-modified burst-read returns are received. Understanding that the tag-modified burst-read returns may be received in an out-of-order sequence that differs from the posted burst-read sequence order, the storage elements 526 of the push queue 524 may be filled with requested read data as the tag-modified burst-read returns are received. In at least some embodiments, the push queue 524 has a depth M that differs from a depth N of the post queue 214, e.g., M>N, and the push-queue read pointer 542" is configured to read from a location in the push queue 524 corresponding to one of the posted burst-read requests, such as the oldest pending posted burst-read request, e.g., corresponding to a first in location of the example FIFO structure. Likewise, a post-queue read pointer 542' points to a location of one of the pending, posted burst-read requests, such as the oldest pending burst-read requests, e.g., corresponding to a first in location of the example FIFO structure. As the push queue 524 may be filled out-of-order, the push-queue read pointer 542" may reference an empty location, while other locations of the push queue 524 may be not empty. Nevertheless, when burst-read return data has been written to the storage element 526 of the push queue 524 pointed to by the push-queue read pointer 542", it is available to be extracted, e.g., popped from the push queue 524.

In at least some embodiments, the push process module 520 provides a NOT_EMPTY indicator providing an indication as to whether the push queue 524 having a finite depth is empty or not empty. For example, the pop process module 540 may monitor the NOT_EMPTY indicator of the push process module 520 and, to the extent the NOT_EMPTY indicator indicated that the storage location 526 pointed to by the push-queue read pointer 542", e.g., representing the burst-read return data of at least some if not all burst cycles of the next pending posted burst-read request according to the posted sequence order are not empty. In at least some embodiments, the NOT_EMPTY indicator may be asserted to indicate that all storage location 526 for all of the burst-read return data pointed to by the push-queue read pointer 542" of the next pending posted burst-read request according to the posted sequence order are not empty, i.e., the complete burst-read return, including all burst cycles as may be indicated and/or otherwise determined according to a burst length, have been pushed into the push queue 524. Similarly, the post process module 510 provides a NOT_EMPTY indicator to the pop process module 520 indicating whether the post queue 514 having a finite depth is empty or not empty. For example, the pop process module 540 may monitor the NOT EMPTY indicator form the post process module 520 and, to the extent the NOT EMPTY indicator indicated that the storage location 516 pointed to by the post-queue read pointer 542', e.g., representing the burst-read request of the next pending posted burst-read request according to the posted sequence order is not empty, the pop process module 540 may issue a pop command to pop and/or otherwise transfer user data from the storage location 516 of the post queue 514 pointed to by the post-queue read pointer 542'. In at least some embodiment, the pop process module 540 controls the post-queue read pointer 542' and the push-queue read pointer 542", e.g., adjusting both as may be necessary to pop information from the queues 514, 525.

For example, the pop process module 540 may issue a pop command to pop and/or otherwise transfer burst-read return data 529*a* and/or the corresponding toggle bit 529*b* from the push queue 524 to the pop process module 540. For example, pop process module 540 may assert a first pop command to the push process module 520 in combination with the push-queue read pointer 542" pointing to a storage element 526 from which burst-read returned data is to be obtained, e.g., from a series of sequential storage elements 526 beginning at the push-queue read pointer 542" and extending according to a corresponding burst depth of the burst-read return. The first pop command causes the stored information to be transferred to the pop process module 540 as pop data and the push-queue read pointer 542" to be incremented to a next storage element 526 of the push queue 524 occurring after a last storage element of the burst-read return data. In this manner, the read return data may be returned to the leader entity 101 according to an order in which the burst-read requests were issued. If a particular storage element 526 pointed to by the incremented push-queue read pointer 542" has not been populated yet, the push process module 520 may not assert a NOT_EMPTY indicator. Accordingly, the pop process module 540 can refrain from asserting the pop command until the NOT_EMPTY indicator indicates that the corresponding storage element 526 is not empty, i.e., it has been populated by all of the returned data of a burst-read return.

According to the illustrative posted burst-read embodiment, the depths of the post queue 514 and the push queue 524 may differ, with a depth of the post queue 514, N, indicating a possible maximum number of burst-read requests that may be posted and pending at any given time. Similarly, a depth of the push queue 524, M, indicating a possible maximum number of burst cycles of pending burst-read requests that may be stored within the push queue 524 at any given time. In at least some embodiments, an empty and/or full status of both queues 514, 524 may be monitored. For example, the post process module 510 may assert a NOT_FULL indicator based on a fill status of the post queue 514 and the push queue 524. Consider a situation in which several posted burst-read requests have high burst values, indicating that the burst-read return of each burst-read request may occupy a high number of the storage elements 526. In this scenario, the post process module 510 may not accept any further burst-read requests despite there being available storage elements 516 in the post queue 514. It is worth noting here that posted burst-reads can include burst depts of a single read-return cycle, effectively servicing non-burst-read requests.

In at least some embodiments, the post process module 510 provides a NOT_EMPTY indicator providing an indication as to whether the storage element pointed to by the post-queue read pointer 542' is not empty, e.g., contains user data 519 associated with a particular burst-read request command. For example, the pop process module 540 may monitor the NOT_EMPTY indicator and to the extent the NOT EMPTY indicator indicated that the particular post-queue storage element 516 not empty, the pop process module 540 may issue a pop command to pop and/or otherwise transfer the user data 519*a* from the post queue 514 to the pop process module 540. For example, pop process module 540 may assert a second pop command to the post process module 510 in combination with a post-queue read pointer 542' pointing to a post-queue storage element 516 from which user data 519*a* associated with a corresponding pushed storage element 526 of the push queue 524 is to be obtained. The second pop command causes the user data 519*a* to be transferred to the pop process module 540 as second pop data and the second read pointer 542' to be incremented to a next post-queue storage element 516. In this manner, the post process module 540 may combine read return data with the corresponding user data 519*a*, e.g., in a pop stage 544, and return a content of the pop stage 544 to the leader entity 101 as read return data, according to an order in which the read requests were issued. If a particular post-queue storage element 516 pointed to by the incremented second read pointer 542' has not been populated yet, the post process module 510 will not assert a NOT_EMPTY indicator. Accordingly, the pop process module 540 can refrain from asserting the pop command until the NOT_EMPTY indicator indicates that the corresponding post-queue storage element 516 is not empty, i.e., it has been populated by user data of a posted read command. In at least some embodiments, the pop process module 540 generates an entry of the active indicator or bit field 546*f* that may be used to signal an availability of read return data in the pop stage 544.

In at least some embodiments, the pop process module 240 asserts a NOT_EMPTY indicator providing an indication when the pop stage 544 is not empty. In response to the pop stage 544 being not empty, the second-stage return bridge 108 asserts a pop command causing the pop process module 540 to provide pop data obtained from the pop stage 544, e.g., including the user information 546*a*, the return data 546*b*, the timeout value field 546*c*, the error indicator field 546*d* the last burst return value and the active bit field 546*c*. The second-stage return bridge 108 may be configured to apply the user data 546 to the returned data 546*b* to obtain adjusted returned data suitable for consumption by the leader entity 101. For example, the second-stage return bridge 108 may perform a protocol conversion according to the user information 546*a*.

In at least some embodiments, a user may specify a depth of the post queue 514 as may determine a maximum number of posted reads pending at any given time. Likewise, a user may specify a depth of the push queue 524 according to the depth of the post queue 514 as adjusted by a maximum burst length. Alternatively, or in addition a user may specify one or more of a user field bit width in the post queue 514 and/or a data field bit width in the push queue 524.

By way of example, there can be one entry in the post queue 514 for each read and up to a burst length of entries in the push queue 524 for each read return set. The post process module 510 can maintain separate write pointers, e.g., a post-queue write pointer 523 (WPTR_POST) for the post queue 514 and push write pointer 530 (WPTR) for the push queue 524. In at least some embodiments, the post queue 514 can be a conventional circular FIFO supporting FULL, EMPTY status and PUSH, POP operations. A maximum number of pending read returns is less than or equal to a depth of the post queue 514 and a sum of the pending read return burst lengths is less than or equal to a depth of the push queue 524. In at least some embodiments, the read return burst length may be calculated dynamically, e.g., added with a push operation, subtracted with a pop operation as may be accomplished using the BURST_LGTH_M1 field. By way of example, a local read cycle triggers a NOT_OVERFLOW check of the two foregoing depth conditions (including the burst length of the pending cycle). If the NOT_OVERFLOW check returns a "true" result, then an entry is pushed into the post queue 514 and a read cycle is forwarded to the follower entity 105 with a TAG equal to a value of the post-queue write pointer 523. The post-queue write pointer 523 is then incremented, e.g., by a value of 1 in a modulo sense according to the depth of the post queue 514: WPTR_POST=(WPTR_POST+1) % POST_DEPTH, and the push write pointer 530 is incremented by the burst length in a module sense according to the depth of the push queue 524: WPTR=(WPTR+burst_length) % DEPTH.

By way of example, at least some of posted burst-read request related information 521 may be stored in post-queue element fields of a post queue entry 516. According to the illustrative embodiment, the post-queue element fields can include one or more of a USER field 519*a*, an error indicator field 519*b*, a TIMEOUT field 519*c*, a BURST_LENGTH_M1 field 519*d*, a START_LANE field 519*e* and a WPTR field 519*f*, referred to generally as post-queue element fields 519. In at least some embodiments, the USER field 519*a* includes application specific user data to be processed with the associated read return data. The error indicator field 519*b* may include an error flag. The error flag may be used for an out of range read address where the read cycle is not sent but an in order dummy read return cycle must be scheduled by the post process, e.g., as used for AXI3 applications. The TIMEOUT field 519*c* may include a timeout counter, e.g., starting at an initial value, such as '0' with the push and periodically increments. If the timeout counter rolls over before the read return cycle arrives then the corresponding post and push elements are popped and dummy read return cycle is scheduled. The BURST_LENGTH_M1 field 519*d* includes a value of the corresponding burst length minus '1'. The START_LANE field 519*e* may include a start lane index of an unaligned or narrow-burst-read and the WPTR field 519*f* may include a value of the post-queue write pointer 523 WPTR at the time the read cycle is launched, equal to the starting address of the push queue data.

When a first element of a burst-read return is available at the push process module 520, the push process module 520 uses a reference value, e.g., the TAG provided in read return data to identify a corresponding push target element of the post write pointer field 519*f* of the post queue 514. In at least some embodiments, the reference value can be determined as a value of the post-queue write pointer 523 associated with the posted burst-read request, e.g., stored within the WPTR field 519*f* of the post-queue element fields 519, which may be appended to the tag-adjusted posted burst-read request and/or the tag-adjusted burst-read return. The burst-read return data of the received burst-read return cycle is then pushed to the push queue 524 at a first empty location occurring at or after a storage location 526 identified by the push-queue write pointer 530 and corresponding push toggle bit, e.g., push queue[WPTR].push_togl, is toggled, e.g., between '0' and '1' to identify the corresponding storage element 526 as being not empty. When a next element of a burst-read return is available at the push process module 520, the push process module 520 uses the TAG to read the corresponding post-queue write pointer field **519*f* of the post-queue storage element 516 of the post queue 514** and then updates the first empty element at a location following the post write pointer. The example posted burst-read process supports out-of-order read returns with an assumption that the burst order is preserved.

The pop process module 540 monitors the post queue 514, the push queue 524 and an ACTV bit from the active bit field of the pop stage buffer 544. When the pop stage buffer 544 is empty, or is being popped, there is a pending read in the post queue 514 and there is corresponding NOT_EMPTY entry in the push queue 524, the pop processes module 540 pops the post and push queues 514, 524, assembles the read return information and pushes it into the pop stage buffer 544. In at least some embodiments, the pop process module 540 is configured to pop an entire burst-read request in a single pop event. Alternatively, or in addition, the pop process module 540 can be configured to pup a burst-read request in more than one pop events, e.g., if a pop buffer is not large enough to store the burst-read return data of a particular posted burst-read request. For example, the pop process module 540 may initiate a first pop process based on a first portion of burst-read return data associated with a posted burst-read request and a second pop process based on a second portion of burst-read return data associated with the same posted burst-read request. The second-stage return bridge 108 pops data from the pop stage buffer 544, e.g., according to the one or more example pop processes, and presents it as a read return cycle on the local bus 103. In at least some embodiments, the pop process module 540 provides tracking information, e.g., user data **516*a*** to identify multiple pop processes that may be related to the same posted burst-read request.

The pop process module 540 can control a post read address pointer 542' (RPTR) of the post queue 514. It may use a value from the post write pointer field **519*f* as a start address of a read return burst. The pop process module 540 may also contain a corresponding POP_TOGL bit for each PUSH_TOGL bit of the push queue 524**. Push element[k] is not empty when POP_TOGL[k]!=PUSH_TOGL[k]. With the last pop of a return burst the PBR_POP increments RPTR_POST (RPTR_POST=(RPTR_POST+1) % DEPTH) and toggles the range POP_TOGL[WPTR:WPTR+BURST_LGTH_M1] to equal PUSH_TOGL[WPTR:WPTR+BURST_LGTH_M1] and set the all push elements in the burst to empty. Note that in at least some embodiments, the pop process module starts forwarding data from a read return burst as it arrives but waits until the last burst element to pop the post and push queues. It is appreciated that an early toggle of POP_TOGL[k], before the push is finished, could corrupt the push process.

Figure 6:
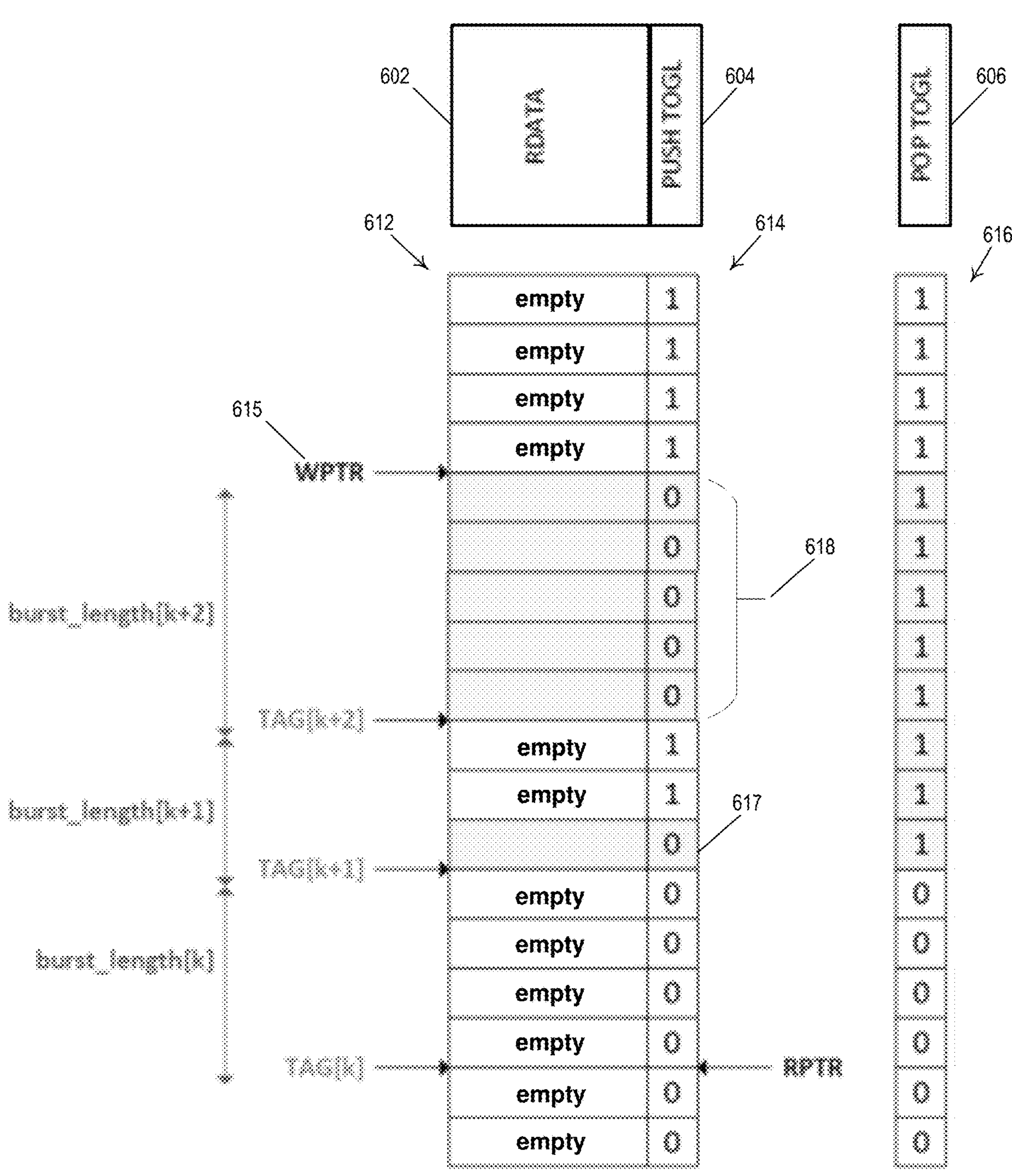
FIG. 6 is a schematic diagram illustrating an example, non-limiting embodiment of posted burst-read return information as may be obtained by the example posted burst-read processor illustrated in FIG. 5, in accordance with various aspects described herein.

FIG. 6 is a schematic diagram illustrating an example, non-limiting embodiment of posted burst-read return information 600 as may be obtained by the example posted burst-read processing system 500 illustrated in FIG. 5, in accordance with various aspects described herein. In one or more embodiments, the posted burst-read return information 600, e.g., as may be pushed onto the push queue 524 (FIG. 5), includes a returned data portion 602 and a push toggle indicator portion 604. According to the illustrative embodiment, the returned data portion 602 has M available posted burst-read return data locations 612, in this example, M=18, configured for storing returned data and/or related tag information. The push toggle indicator portion 604 also has M available push-toggle locations 614, again, in this example M=18, containing push indicators, e.g., push toggle bits, corresponding to the posted burst-read return data locations 612.

In operation, each of the 18 available push-toggle locations 614 includes a respective toggle bit that may be toggled between states, e.g., between '0' and '1' upon a push operation of the posted burst-read return data into a corresponding posted burst-read return data location 612, e.g., into a storage element 526 of the push queue 524 (FIG. 5). Read return data may be stored in the posted burst-read return data locations 612 according to a write pointer 615. In at least some embodiments, a value of the write pointer 615 may be determined according to a tag value returned with the posted burst-read return data. According to the illustrative example, first posted burst-read return data is written into a seventh location 617 of the available posted burst-read return data locations 612, while second posted burst-read return data is written into a tenth through fourteenth locations 618 of the available posted burst-read return data locations 612. The push toggle value for each of the seventh location 617 and tenth through fourteenth locations 618 is toggled from a '0' to a '1' indicating that posted burst-read return data has been written in the corresponding posted burst-read return data locations 612.

In at least some embodiments, the posted burst-read return information 600 can be associated with a pop toggle indicator portion 606. According to the illustrative embodiment, the pop toggle indicator portion 606 also has M available pop toggle locations 616, in this example M=18, corresponding to the posted burst-read return data locations 612 and the push toggle locations 614. In operation, each of the M available pop toggle locations 616 includes a respective toggle bit that may be toggled between states, e.g., between '0' and '1' upon a popping of posted burst-read return data from the push queue 524 (FIG. 5). Accordingly, once the returned data has been popped for any of the corresponding posted burst-read return data locations 612, the pop toggle value of the M available locations 616, again, in this example M=18, is toggled to a value corresponding to a corresponding push toggle value in one of the 18 available push-toggle locations 614. For example, the push toggle values in the example 18 available push-toggle locations 614 are equivalent to the pop toggle values of the M=18 available locations 616 for all empty returned data locations 612, indicating that the posted burst-read return data locations 612 are empty, e.g., they are being popped or have already been popped. However, the push toggle values of the seventh location 617 and tenth through fourteenth locations 618, which are not empty, have different push toggle values of the push-toggle locations 614 and pop toggle values of the M=18 available locations 616. For example, a comparison of the push toggle values of the push-toggle locations 614 and the pop toggle values of the M=18 available locations 616 can be used to determine whether corresponding returned data locations 612 are empty or loaded with posted burst-read return data.

Figure 7:
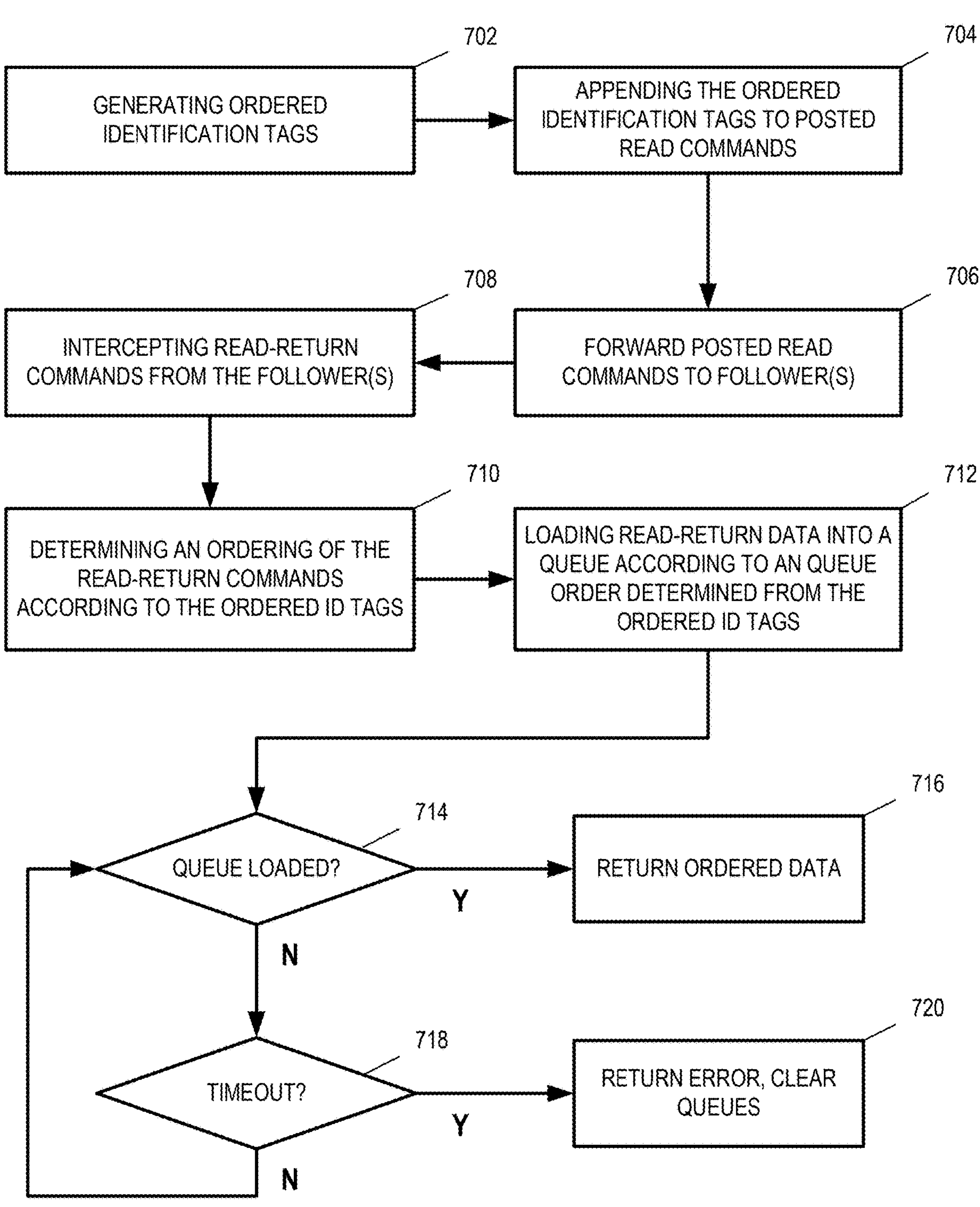
FIG. 7 depicts an illustrative embodiment of an out-of-order read-return equalization process in accordance with various aspects described herein.

FIG. 7 depicts an illustrative embodiment of an out-of-order read-return equalization process 700 in accordance with various aspects described herein. The example out-of-order read-return equalization process 700 includes generating ordered identification tags at 702. In at least some embodiments, the ordered identification tags include an indication of an order at which corresponding posted read and/or posted burst-read commands were issued by a leader entity 101 (FIG. 1). For example, the identification tags may include an index variable that may be incremented according to a queue location. In at least some embodiments, the index variable may be incremented according to a modulo fashion taking into account a depth of a post buffer. For example, the index variable may equate to and/or otherwise correspond to a write pointer configured to reference a next available empty storage location of the post queue.

According to the illustrative out-of-order read-return equalization process 700, the ordered identification tags may be appended to, incorporated into and/or otherwise associated with the associated posted read commands at 704 to obtain tagged posted read commands. The tagged posted read commands, in turn, may be forwarded to the posted read commands at 706, to one or more follower(s) corresponding to the posted read requests. It is understood that the follower(s) may process the tagged posted read commands to obtain requested data and return the requested data in read-return commands. In at least some embodiments, the read-return commands may include the identification tags.

Further according to the illustrative out-of-order read-return equalization process 700, the read-return commands from the follower(s) may be received, monitored and/or otherwise intercepted at 708. When intercepted, the read return commands are prevented from returning data to the requesting leader entity 101 until a determination is made that the read-return data is ready for forwarding to satisfy the posted read requests.

For example, in at least some embodiments, an ordering of the read-return commands is performed at 710 according to the ordered ID tags. Such an ordering may be beneficial to permit returning ordered read-return data to the requesting leader entity 101, even though such read-return data may be provided by the follower(s) in an out-of-order manner.

In at least some embodiments, the read-return data may be loaded at 712, into a queue according to a queue order determined from the ordered ID tags. A determination may be made at 714, as to whether the read-return queue has been sufficiently loaded. To the extent that it is determined at 714, that the read-return queue has been sufficiently loaded, the process 700 proceeds to return the ordered read-return data at 716, e.g., popping values to a pop process module 240 (FIG. 2) that may assemble, prepare and/or otherwise transfer the read data to the leader entity 101 (FIG. 1), e.g., making it available on the local bus 103. However, to the extent that it is determined at 714 that the read-return queue is not loaded, the process 700 proceeds to determine at 718 whether a timeout period has expired. To the extent that it is determined at 718 that the timeout period has expired, an error indicator may be returned at 720. Alternatively, or in addition, one or more of the queue structures supporting out-of-order equalization of the posted read commands may be cleared, flushed and/or otherwise marked as empty. However, to the extent that is determined at 718 that the timeout period has not expired, the process 700 may return to 714 to determine whether the read-return queue has been loaded.

While for purposes of simplicity of explanation, the respective processes are shown and described as a series of blocks in FIG. 7, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. Note, one or more blocks can be performed in response to one or more other blocks.

Further, some portions of embodiments can be combined with portions of other embodiments.

Figure 8:
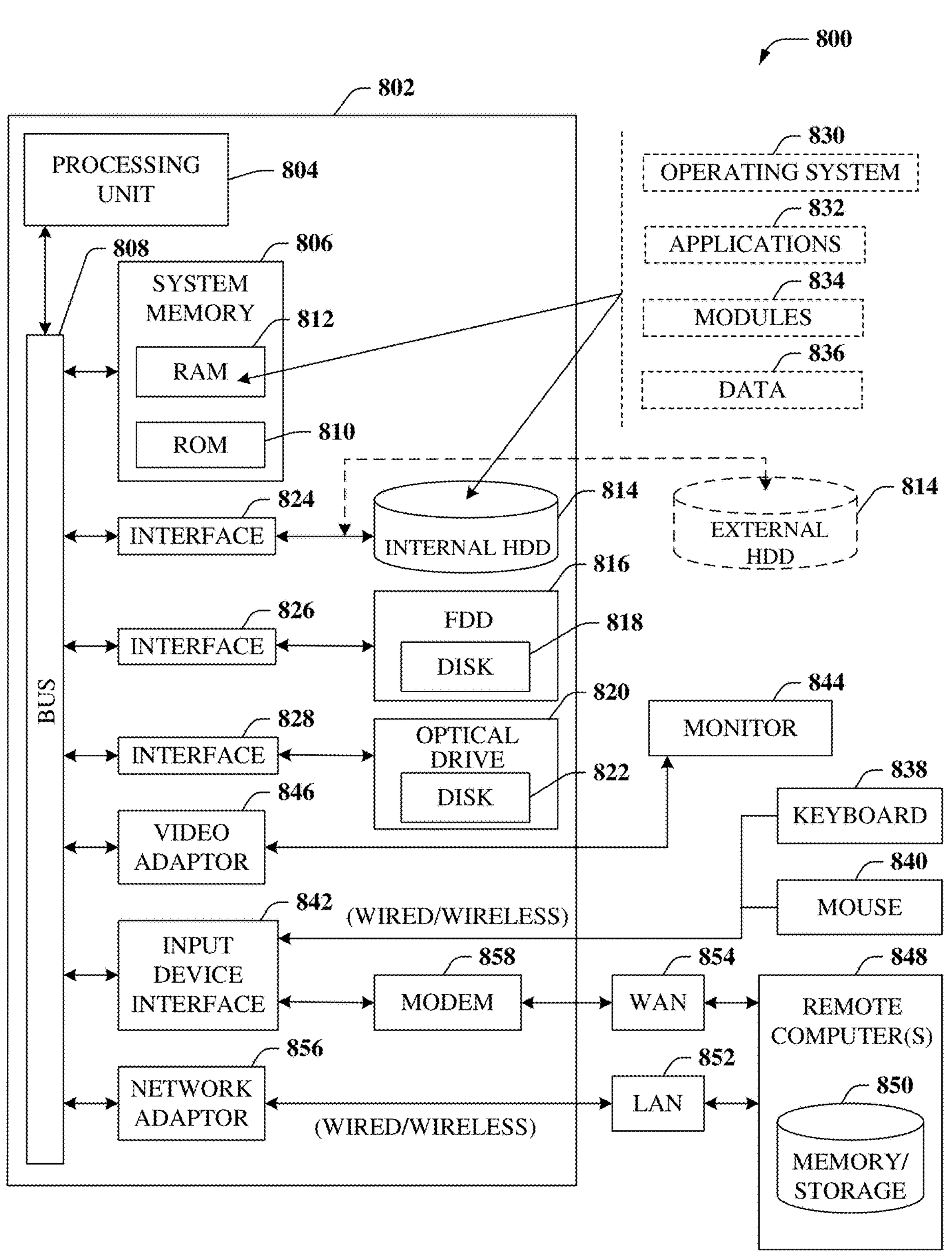
FIG. 8 is a block diagram of an example, non-limiting embodiment of a computing environment in accordance with various aspects described herein.

Turning now to FIG. 8, there is illustrated a block diagram of a computing environment 800 in accordance with various aspects described herein. In order to provide additional context for various embodiments of the embodiments described herein, FIG. 8 and the following discussion are intended to provide a brief, general description of a suitable computing environment 800 in which the various embodiments of the subject disclosure can be implemented. In particular, the computing environment 800 can be used in the computing device described herein. Each of these devices can be implemented via computer-executable instructions that can run on one or more computers, and/or in combination with other program modules and/or as a combination of hardware and software. For example, computing environment 800 can facilitate in whole or in part continuing processing of a service by a server in response to a request from a client computing device as a blocking call after an initial timeout or converting the blocking call to a non-blocking call after an initial timeout. Further, each of the posted read processing system 104, the leader entity 101, the follower entities 105, the post process module 110, 210, 510 the push process module 112, 220, 520 the pop process module 114, 240, 540, the posted read processing system 200 and the posted burst-read processing system 500 can comprise computing environment 800.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 8, the example computing environment 800 can comprise a computer 802, the computer 802 comprising a processing unit 804, a system memory 806 and a system bus 808. The system bus 808 couples system components including, but not limited to, the system memory 806 to the processing unit 804. The processing unit 804 can be any of various commercially available processors. Dual microprocessors and other multiprocessor architectures can also be employed as the processing unit 804.

The system bus 808 can be any of several types of bus structure that can further interconnect to a memory bus (with or without a memory controller), a peripheral bus, and a local bus using any of a variety of commercially available bus architectures. The system memory 806 comprises ROM 810 and RAM 812. A basic input/output system (BIOS) can be stored in a non-volatile memory such as ROM, erasable programmable read only memory (EPROM), EEPROM, which BIOS contains the basic routines that help to transfer information between elements within the computer 802, such as during startup. The RAM 812 can also comprise a high-speed RAM such as static RAM for caching data.

The computer 802 further comprises an internal hard disk drive (HDD) 814 (e.g., EIDE, SATA), which internal HDD 814 can also be configured for external use in a suitable chassis (not shown), a magnetic floppy disk drive (FDD) 816, (e.g., to read from or write to a removable diskette 818) and an optical disk drive 820, (e.g., reading a CD-ROM disk 822 or, to read from or write to other high-capacity optical media such as the DVD). The HDD 814, magnetic FDD 816 and optical disk drive 820 can be connected to the system bus 808 by a hard disk drive interface 824, a magnetic disk drive interface 826 and an optical drive interface 828, respectively. The hard disk drive interface 824 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 802, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 812, comprising an operating system 830, one or more application programs 832, other program modules 834 and program data 836. All or portions of the operating system, applications, modules, and/or data can also be cached in the RAM 812. The systems and methods described herein can be implemented utilizing various commercially available operating systems or combinations of operating systems.

A user can enter commands and information into the computer 802 through one or more wired/wireless input devices, e.g., a keyboard 838 and a pointing device, such as a mouse 840. Other input devices (not shown) can comprise a microphone, an infrared (IR) remote control, a joystick, a game pad, a stylus pen, touch screen or the like. These and other input devices are often connected to the processing unit 804 through an input device interface 842 that can be coupled to the system bus 808, but can be connected by other interfaces, such as a parallel port, an IEEE 1394 serial port, a game port, a universal serial bus (USB) port, an IR interface, etc.

A monitor 844 or other type of display device can be also connected to the system bus 808 via an interface, such as a video adapter 846. It will also be appreciated that in alternative embodiments, a monitor 844 can also be any display device (e.g., another computer having a display, a smart phone, a tablet computer, etc.) for receiving display information associated with computer 802 via any communication means, including via the Internet and cloud-based networks. In addition to the monitor 844, a computer typically comprises other peripheral output devices (not shown), such as speakers, printers, etc.

The computer 802 can operate in a networked environment using logical connections via wired and/or wireless communications to one or more remote computers, such as a remote computer(s) 848. The remote computer(s) 848 can be a workstation, a server computer, a router, a personal computer, portable computer, microprocessor-based entertainment appliance, a peer device or other common network node, and typically comprises many or all of the elements described relative to the computer 802, although, for purposes of brevity, only a remote memory/storage device 850 is illustrated. The logical connections depicted comprise wired/wireless connectivity to a local area network (LAN)

852 and/or larger networks, e.g., a wide area network (WAN) 854. Such LAN and WAN networking environments are commonplace in offices and companies, and facilitate enterprise-wide computer networks, such as intranets, all of which can connect to a global communications network, e.g., the Internet.

When used in a LAN networking environment, the computer 802 can be connected to the LAN 852 through a wired and/or wireless communication network interface or adapter 856. The adapter 856 can facilitate wired or wireless communication to the LAN 852, which can also comprise a wireless AP disposed thereon for communicating with the adapter 856.

When used in a WAN networking environment, the computer 802 can comprise a modem 858 or can be connected to a communications server on the WAN 854 or has other means for establishing communications over the WAN 854, such as by way of the Internet. The modem 858, which can be internal or external and a wired or wireless device, can be connected to the system bus 808 via the input device interface 842. In a networked environment, program modules depicted relative to the computer 802 or portions thereof, can be stored in the remote memory/storage device 850. It will be appreciated that the network connections shown are examples and other means of establishing a communications link between the computers can be used.

The computer 802 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT, 100BaseT, 1000BastT wired Ethernet networks used in many offices.

In at least some embodiments, the self-contained layer may be implemented in hardware, in software, or in any combination of hardware and software. Hardware may include, for example, any combination of addressable memory devices, registers, bus architectures, controllers, logic devices, state machines, and so on. It is understood that the example leader and follower entities disclosed herein may include physical devices, such as microprocessors, CPUs, communications devices, peripheral devices, and the like. Alternatively, or in addition, the example leader and follower entities may include logical devices, software routines and/or processes as may be running on a physical processor, e.g., application programs, operating systems, and so on. Additionally, the example queue structures referred to herein may be implemented in hardware, software and/or any combination thereof. The queue structures may include addressable memory locations and/or registers. In at least some embodiments, the queue structures may include any combination of stacks, last-in-first-out (LIFO) structures, first-in-first out (FIFO) structures, buffers and the like.

It is worth noting here that in at least some embodiments the local bus 103 (FIG. 1) and the network 106 may operate according to the same and/or similar structure that may utilize the same, similar and/or different network and/or bus architectures and/or networking data-exchange and/or bus protocols. In at least some embodiments, the network 106 is the local bus 103. It is envisioned that in at least some embodiments, the network 106 may include a local area network (LAN) and/or a mobile network, e.g., according to any of the illustrative examples disclosed herein and/or otherwise generally known. Alternatively, or in addition, the network 106 may include a wide area network, such as the Internet and/or the Web. For example, the leader process may be a process, such as an application program, e.g., a web browser, running on a host machine and requesting content, i.e., “read requests” including posted and/or burst-read requests, from a follower process that may be running on another device, e.g., a remote server. The follower process may return the content, which may be returned in order and/or out-of-order. The out-of-order read-return equalization techniques disclosed herein may be utilized to intercept out-of-order returns and reorder them before returning and/or otherwise making the returned content available to the lead process. Content may include, without limitation, files, e.g., text files, images, HTML documents, web pages, and the like. Alternatively, or in addition, the content may include streaming content, such as streaming audio, video and so on. Alternatively, or in addition, the content requests, e.g., read requests, and/or content returns, e.g., read returns, may relate to virtual reality applications, augmented reality situations, and the like.

By way of example, an application of posted read process and/or posted burst-read process can be included as part of a leader entity 101 interface to a system, such as to an ASIC internal bus. Such an approach frees up the leader entity 101 to pipeline read cycles and tolerate any out-of-order read return as may be returned by follower entities 105, e.g., having different response times and possibly different clock domains. Without limitation, a second application of the posted read process and/or posted burst-read process can be included as to support a memory-mapped read-write network spanning multiple ASICs and even multiple systems. As a third application the posted read process and posted burst-read process can be utilized for test equipment, e.g., ASIC Testers. Traditionally, when an ASIC Tester reads from a device under test (DUT) it needs to know the exact delay of each read return. The minimum interval time for sequence of read cycles is equal to the sum of the read delays. Beneficially, an application of the posted read process and/or posted burst-read process to such a tester can break a sequence into a back-to-back set of reads, a single delay as the push queue fills up and an efficient set of short fixed delay reads from the pop stage.

The terms “first,” “second,” “third,” and so forth, as used in the claims, unless otherwise clear by context, is for clarity only and does not otherwise indicate or imply any order in time. For instance, “a first determination,” “a second determination,” and “a third determination,” does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, f(x) =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method of managing read returns, comprising:

generating, by a processing system including a processor, a plurality of reference tags, the plurality of reference tags appended to a plurality of pending read-request operations generated according to an ordered arrangement by a leader process and requesting a return of read data from a plurality of follower processes;

intercepting, by the processing system, a plurality of read-return operations comprising the plurality of reference tags, wherein the plurality of read-return operations further comprises returned read data obtained in no particular order from the plurality of follower processes responsive to the plurality of pending read-request operations;

arranging, by the processing system, the returned read data obtained in no particular order via the plurality of read-return operations according to the plurality of reference tags to obtain ordered returned read data according to the ordered arrangement; and providing, by the processing system, the ordered returned read data to the leader process, wherein the arranging comprises:

determining that (i) a pop stage buffer is empty or being popped, (ii) a pending read-request operation remains pending according to a post queue, and (iii) a next ordered portion of the returned read data corresponding to an oldest pending read-request operation is present in a push queue;

responsive to determining (i)-(iii), popping user information associated with the oldest pending read-request operation from the post queue and popping the next ordered portion of the returned read data from the push queue;

assembling read-return information comprising the user information and the next ordered portion of the returned read data into the pop stage buffer; and asserting an active indicator indicating availability of the read-return information in the pop stage buffer for output to the leader process.

2. The method of claim 1, further comprising:

storing, by the processing system, a plurality of user information in the post queue to obtain a stored plurality of user information, wherein the plurality of user information corresponds to the plurality of pending read-request operations.

3. The method of claim 2, wherein each reference tag of the plurality of reference tags corresponds to a respective write location value configured to reference a respective register of the post queue.

4. The method of claim 3, wherein the arranging the returned read data obtained in no particular order further comprises:

pushing the returned read data obtained from the plurality of follower processes onto the push queue comprising a plurality of push queue registers addressable via push queue indexes, wherein the returned read data is pushed into the push queue registers via the push queue indexes according to the reference tags to obtain ordered, returned read data.

5. The method of claim 4, wherein the post queue comprises a first-in-first-out (FIFO) queue.

6. The method of claim 4, wherein the post queue comprises a predetermined post queue depth corresponding to a number of available push queue registers.

7. The method of claim 6, wherein a push queue depth of the push queue equates to the predetermined post queue depth.

8. The method of claim 3, further comprising:

comparing, by the processing system, the respective write location value to a post queue depth to obtain a comparison result;

determining, by the processing system, a post-queue-full status based on the comparison result; and inhibiting, by the processing system, issuance of a read-request operation of the plurality of pending read-request operations to the plurality of follower processes responsive to the post-queue-full status.

9. The method of claim 2, wherein the plurality of read-return operations is configured according to a first protocol.

10. The method of claim 9, wherein the plurality of user information corresponds to one of the first protocol, a second protocol, or a combination thereof.

11. The method of claim 10, further comprising:

performing, by the processing system, a protocol conversion between the first protocol and the second protocol.

12. The method of claim 1, wherein the plurality of pending read-request operations comprises pipelined read-request operations, wherein the plurality of pending read-request operations is asserted to the plurality of follower processes before intercepting a first read-return operation of the plurality of read-return operations.

13. The method of claim 1, wherein the plurality of pending read-request operations comprises a burst-read request operation configured to obtain read return data from more than one return operation of the plurality of read-return operations.

14. The method of claim 13, further comprising:

storing, by the processing system, a plurality of user information in the post queue to obtain a stored plurality of user information corresponding to the plurality of pending read-request operations; and storing, by the processing system, ordered read data of the plurality of read-return operations in the push queue, wherein a queue size of the push queue is larger than a queue size of the post queue.

15. A read-return management system, comprising:

a post process module configured to generate a plurality of reference tags, the plurality of reference tags appended to a plurality of pending read-request operations generated by a leader process, requesting read data from a plurality of follower processes;

a push process module configured to:

intercept a plurality of read-return operations comprising, in no particular order, a plurality of returned read data segments obtained from the plurality of follower processes responsive to the plurality of pending read-request operations, wherein the plurality of returned read data segments comprise the plurality of reference tags corresponding to the plurality of pending read data operations; and arrange the plurality of returned read data segments according to the plurality of reference tags to obtain a plurality of ordered, returned read data segments; and a pop process module in communication with the post process module and the push process module and configured to provide the plurality of ordered, returned read data segments to the leader process responsive to information obtained from the post process module and information obtained from the push process module, wherein the push process module is configured to obtain the plurality of ordered, returned read data segments by:

determining that (i) a pop stage buffer is empty or being popped, (ii) a pending read-request operation remains pending according to a post queue, and (iii) a next ordered portion of the returned read data corresponding to an oldest pending read-request operation is present in a push queue;

responsive to determining (i)-(iii), popping user information associated with the oldest pending read-request operation from the post queue and popping the next ordered portion of the returned read data from the push queue;

assembling read-return information comprising the user information and the next ordered portion of the returned read data into the pop stage buffer; and asserting an active indicator indicating availability of the read-return information in the pop stage buffer for output to the leader process.

16. The read-return management system of claim 15, wherein the post process module comprises the post queue, the post queue comprising a plurality of post queue storage locations configured to store a plurality of user information corresponding to the plurality of pending read-request operations, and wherein the plurality of reference tags comprises a plurality of unique reference tag values configured to reference the plurality of post queue storage locations.

17. The read-return management system of claim 16, wherein the plurality of unique reference tag values are based on write location values, and wherein the push process module comprises the push queue, the push queue comprising a plurality of indexed push queue storage locations configured to store a plurality of read-return data at index locations of the plurality of indexed push queue storage locations that correspond to the plurality of reference tags.

18. The read-return management system of claim 17, wherein the information obtained from the post process module comprises user information of the plurality of user information.

19. The read-return management system of claim 17, wherein the information obtained from the push process module comprises the plurality of ordered, returned read data segments.

20. A read-return management system, comprising:

a post queue comprising a plurality of post queue storage locations accessible via a post write location indicator, wherein the post queue, responsive to a posted read command of a plurality of posted read commands issued by a leader process, is configured to obtain a post reference value corresponding to an ordering of the plurality of posted read commands, and to provide the post reference value to the leader process, permitting an appending of the post reference value to the posted read command to obtain an order-referenced posted read command;

a push queue comprising a plurality of push queue storage locations accessible via a push write location indicator, wherein the push queue, responsive to interception of an order-referenced read-return, stores the order-referenced read-return at a push queue storage location corresponding to a push reference value of the push write location indicator, wherein the push reference value further corresponds to the post reference value; and a pop process module in communication with the post queue and the push queue, wherein the pop process module is configured to detect a presence of ordered, read-return data within the push queue, ordered according to the ordering of posted read commands of the plurality of posted read commands issued by a leader process, and to provide the ordered, read-return data to the leader process, wherein the pop process module is configured to provide the ordered, read-return data by:

determining that (i) a pop stage buffer is empty or being popped, (ii) a pending read-request operation remains pending according to the post queue, and (iii) a next ordered portion of the returned read data corresponding to an oldest pending read-request operation is present in the push queue;

responsive to determining (i)-(iii), popping user information associated with the oldest pending read-request operation from the post queue and popping the next ordered portion of the returned read data from the push queue;

assembling read-return information comprising the user information and the next ordered portion of the returned read data into the pop stage buffer; and asserting an active indicator indicating availability of the read-return information in the pop stage buffer for output to the leader process.

* * * * *